(12) United States Patent
Cloke et al.

(10) Patent No.: US 7,068,459 B1
(45) Date of Patent: Jun. 27, 2006

(54) ADJUSTING TRACK DENSITY BY CHANGING PES ALGORITHM WHEN SERVO WRITING A DISK DRIVE FROM SPIRAL TRACKS

(75) Inventors: Robert L. Cloke, Santa Clara, CA (US); Siri S. Weerasooriya, Campbell, CA (US); Tehri S. Lee, San Jose, CA (US); Edgar D. Sheh, San Jose, CA (US); Wing Ying, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 149 days.

(21) Appl. No.: 10/946,462

(22) Filed: Sep. 20, 2004

(51) Int. Cl.
*G11B 21/02* (2006.01)
*G11B 5/09* (2006.01)
*G11B 5/596* (2006.01)

(52) U.S. Cl. .................... 360/75; 360/51; 360/77.07
(58) Field of Classification Search .................... None
See application file for complete search history.

(56) References Cited

U.S. PATENT DOCUMENTS

| | | | |
|---|---|---|---|
| 4,945,427 A | 7/1990 | Cunningham | |
| 5,576,906 A | 11/1996 | Fisher et al. | |
| 5,668,679 A * | 9/1997 | Swearingen et al. | 360/75 |
| 5,940,237 A | 8/1999 | Takagi | |
| 6,040,955 A | 3/2000 | Brown et al. | |
| 6,411,453 B1 | 6/2002 | Chainer et al. | |
| 6,429,989 B1 | 8/2002 | Schultz et al. | |
| 6,493,176 B1 | 12/2002 | Deng et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |
| 6,704,156 B1 | 3/2004 | Baker et al. | |
| 6,738,205 B1 | 5/2004 | Moran et al. | |
| 6,765,737 B1 | 7/2004 | Lim et al. | |
| 6,965,489 B1 * | 11/2005 | Lee et al. | 360/75 |
| 6,977,789 B1 * | 12/2005 | Cloke | 360/75 |
| 6,987,636 B1 * | 1/2006 | Chue et al. | 360/75 |

* cited by examiner

*Primary Examiner*—K. Wong
(74) *Attorney, Agent, or Firm*—Howard H. Sheerin, Esq.

(57) ABSTRACT

A method and apparatus is disclosed for writing product servo sectors to a disk of a disk drive to define a plurality of data tracks. The disk drive comprises the disk and a head actuated over the disk. The disk comprises a plurality of spiral tracks which are read using the head to synchronize a write clock and to generate a position error signal (PES) according to a PES algorithm used to maintain the head along a first servo track while writing product servo sectors along the first servo track. The PES algorithm is adjusted to seek the head to a second servo track, and the head is used to write product servo sectors along the second servo track.

38 Claims, 22 Drawing Sheets

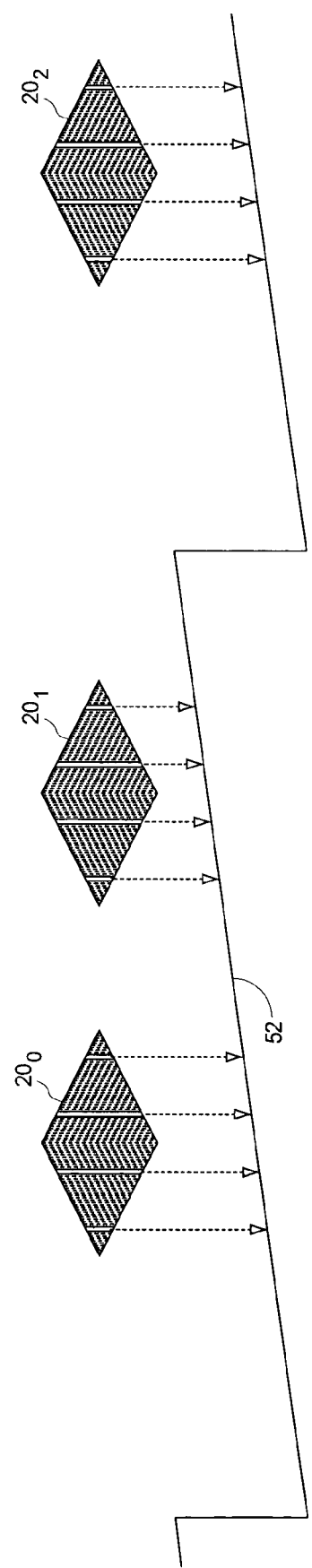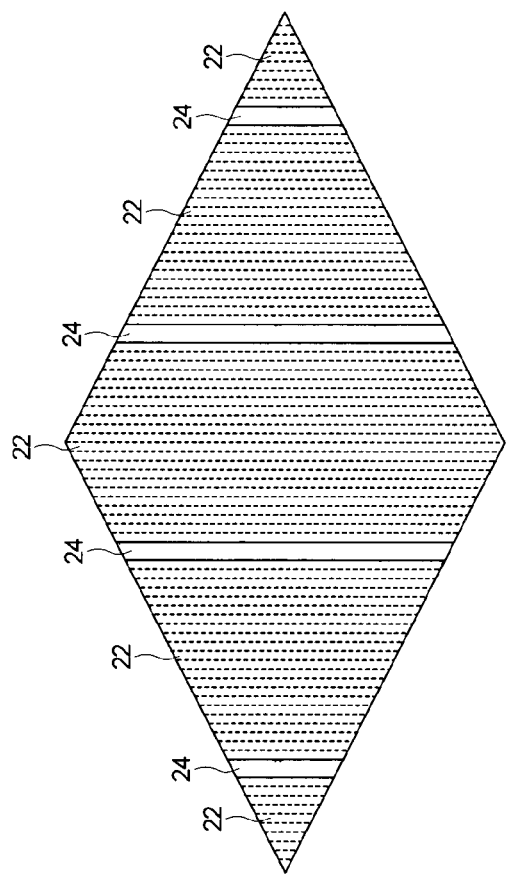

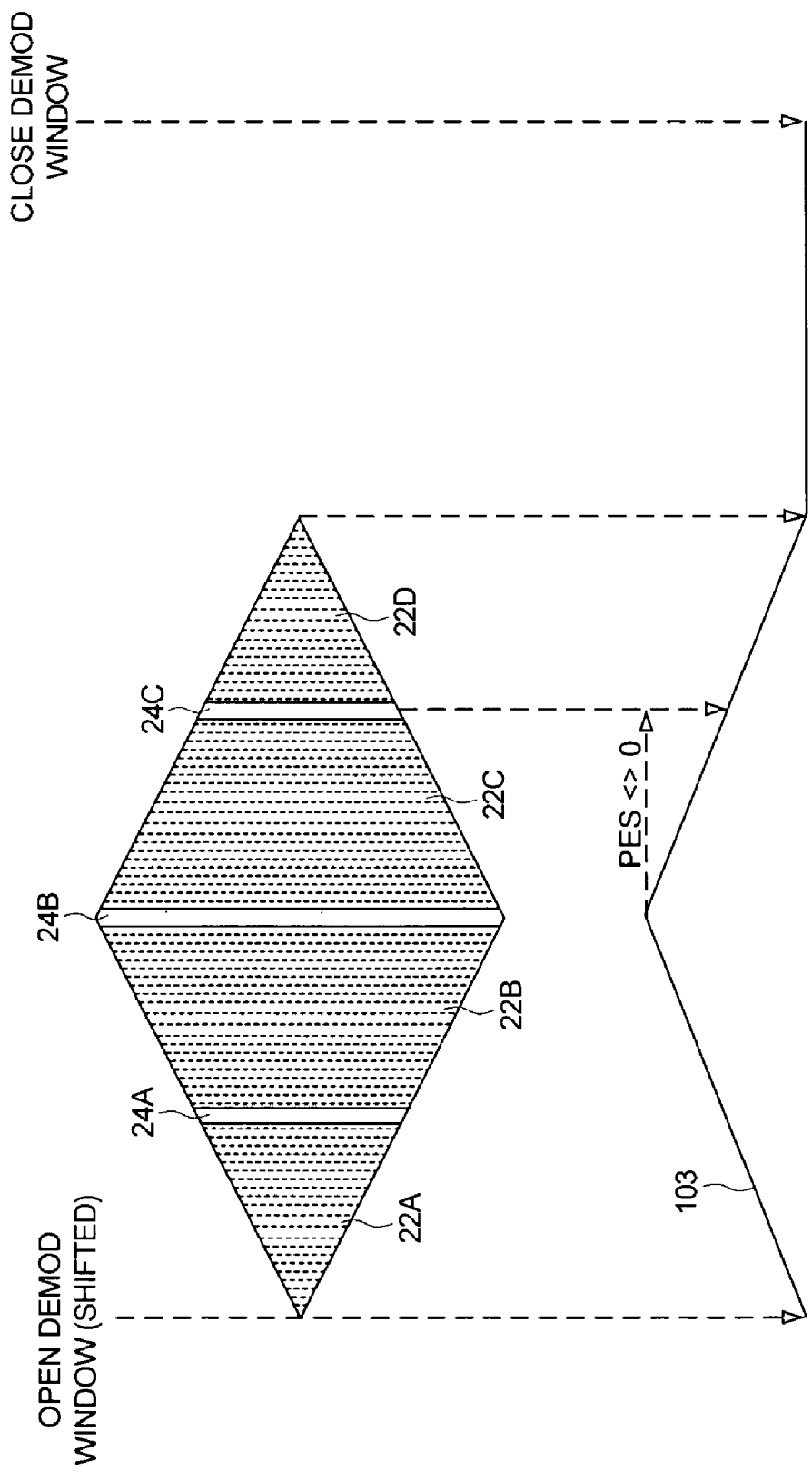

ADJUSTING TRACK DENSITY BY CHANGING PES ALGORITHM WHEN SERVO WRITING A DISK DRIVE FROM SPIRAL TRACKS

BACKGROUND OF THE INVENTION

1. Field of the Invention

The present invention relates to disk drives for computer systems. More particularly, the present invention relates to adjusting the track density by changing the position error signal (PES) algorithm when servo writing a disk drive from spiral tracks.

2. Description of the Prior Art

When manufacturing a disk drive, servo sectors $2_0$–$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$–$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

The track density as determined from the width of each track 6 is typically optimized for each head/disk interface. For example, a prior art technique referred to as a SQUASH measurement may determine the combined width of the read/write elements and therefore the optimal track density for each disk surface. The servo bursts 14 are then written to each disk surface in response to the SQUASH measurement to attain the desired track density. The track density may also be adjusted over the disk radius to compensate for degradation in reproduction accuracy due to various factors. For example, the track density is typically decreased toward the outer diameter tracks where servo errors (track misregistration errors) are amplified due to the increase in linear velocity, windage, and disk flutter affects. The track density may also be decreased toward the inner diameter tracks to reduce inter-track interference caused by the YAW angle of the actuator arm, particularly in disk drives employing magnetoresistive (MR) heads wherein a gap exists between the read element and the write element.

In the past, external servo writers have been used to write the product servo sectors $2_0$–$2_N$ to the disk surface during manufacturing. External servo writers employ extremely accurate head positioning mechanics, such as a laser interferometer, to ensure the product servo sectors $2_0$–$2_N$ are written at the proper radial location from the outer diameter of the disk to the inner diameter of the disk, as well as to achieve the desired track density for each head/disk interface as well as over the radius of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. However, the '679 patent does not disclose how to optimize the track density for each head/disk interface or over the radius of the disk.

There is, therefore, a need to optimize the track density in a disk drive when servo writing from spiral tracks.

SUMMARY OF THE INVENTION

The present invention may be regarded as a method of writing product servo sectors to a disk of a disk drive to define a plurality of data tracks. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of spiral tracks, wherein the head internal to the disk drive is used to read the spiral tracks to generate a read signal. The read signal is processed to synchronize a servo write clock and to generate a position error signal (PES) according to a PES algorithm. The position error signal is used to maintain the head along a first servo track while writing product servo sectors along the first servo track. The PES algorithm is adjusted to seek the head to a second servo track, and the head is used to write product servo sectors along the second servo track.

In one embodiment, an external spiral track writer is used to write the spiral tracks to the disk.

In another embodiment, each spiral track comprises a high frequency signal interrupted at a predetermined interval by a sync mark. In one embodiment, the servo write clock is synchronized by detecting the sync marks in the spiral tracks, and in one embodiment, the position error signal is generated by demodulating the high frequency signal in the spiral tracks.

In yet another embodiment, the high frequency signal is demodulated into a plurality of servo bursts, and in one embodiment, the position error signal is generated by computing a difference between the servo burst signals. In one embodiment, the PES algorithm is adjusted by adjusting the computing of the difference between the servo burst signals.

In still another embodiment, the high frequency signal in the spiral tracks is demodulated by integrating the read signal to generate a ramp signal. In one embodiment, the position error signal is generated relative to a target sync mark in a spiral track and a reference point of the ramp signal. In one embodiment, PES algorithm is adjusted by adjusting the reference point of the ramp signal.

In another embodiment, the high frequency signal in the spiral tracks is demodulated by generating an envelope signal from the read signal. In one embodiment, the position error signal is generated relative to a target sync mark in a spiral track and a peak in the envelope signal. In one embodiment, the PES algorithm is adjusted by adjusting an offset relative the target sync mark and the peak in the envelope signal.

In yet another embodiment, a target track density is established for the head and disk, and the PES is adjusted in response to the target track density.

In still another embodiment, the PES algorithm is adjusted to attain a first density of data tracks over a first radial segment of the disk, and the PES algorithm is adjusted to attain a second density of data tracks over a second radial segment of the disk, wherein the first density is substantially different than the second density.

In another embodiment, the PES algorithm is adjusted to compensate for a change in slope of the spiral tracks. For example, the slope of the spiral tracks may change toward the outer and inner diameter of the disk due to an acceleration and deceleration phase while writing the spiral tracks.

The present invention may also be regarded as a disk drive comprising a disk having a plurality of spiral tracks recorded thereon, a head actuated over the disk, and control circuitry for writing product servo sectors to the disk to define a plurality of data tracks. The head internal to the disk drive is used to read the spiral tracks to generate a read signal. The read signal is processed to synchronize a servo write clock and to generate a position error signal (PES) according to a PES algorithm. The position error signal is used to maintain the head along a first servo track while writing product servo sectors along the first servo track. The PES algorithm is adjusted to seek the head to a second servo track, and the head is used to write product servo sectors along the second servo track.

BRIEF DESCRIPTION OF THE DRAWINGS

FIG. 4A shows an embodiment of the present invention wherein a servo write clock is synchronized by clocking a modulo-N counter relative to when the sync marks in the spiral tracks are detected.

FIG. 4B shows an eye pattern generated by reading the spiral track, including the sync marks in the spiral track.

FIG. 11B illustrates initiating a seek operation by shifting the demodulation window an integer number of sync marks to generate a non-zero PES.

DESCRIPTION OF THE PREFERRED EMBODIMENTS

Figure 2B:
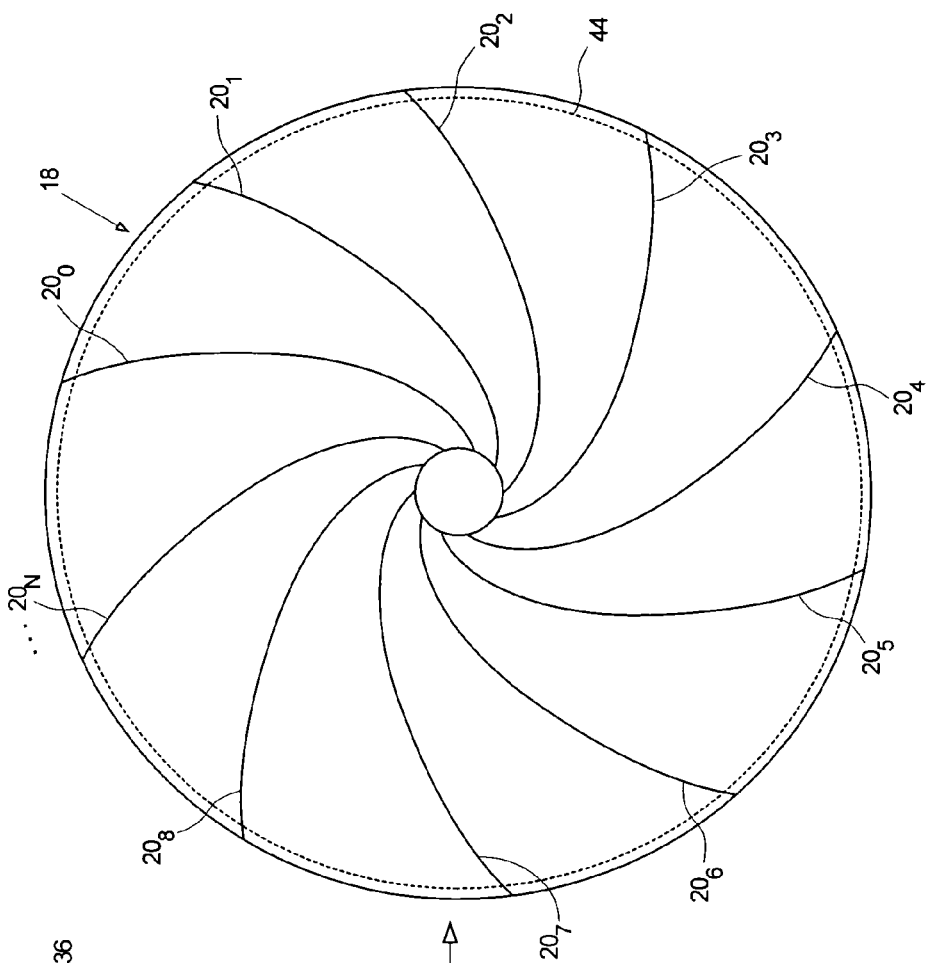
FIGS. 2A and 2B illustrate an embodiment of the present invention wherein an external spiral servo writer is used to write a plurality of spiral tracks to the disk for use in writing product servo sectors to the disk.
Figure 2A:
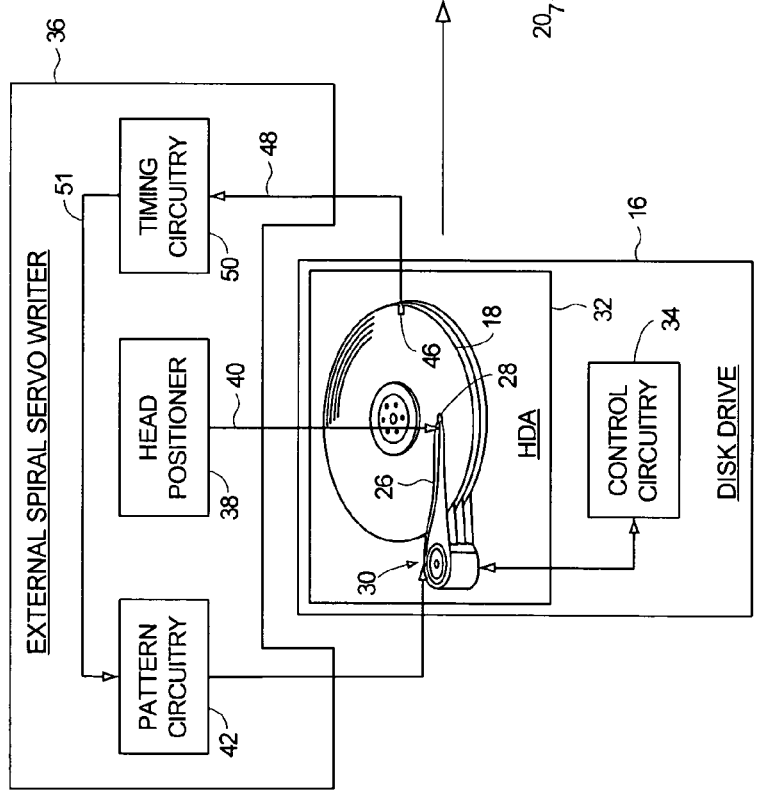

FIGS. 2A and 2B show an embodiment of the present invention wherein a plurality of spiral tracks $20_0$–$20_N$ are written to a disk 18 of a disk drive 16 using an external spiral servo writer 36 (in an alternative embodiment, the spiral tracks are stamped onto the disk using magnetic printing techniques). The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$–$20_N$ are written on the disk 18 at a predetermined circular location determined from the write clock. In one embodiment, each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. While the head positioner 38 moves the head 28 at a predetermined velocity profile over the stroke of the actuator arm 26, pattern circuitry 42 generates the data sequence written to the disk 18 for a spiral track 20.

The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$–$20_N$ to the disk 18. The timing recovery circuitry 50 enables the pattern circuitry 42 at the appropriate time relative to the write clock 51 so that the spiral tracks $20_0$–$20_N$ are written at the appropriate circular location. The timing recovery circuitry 50 also enables the pattern circuitry 42 relative to the write clock 51 to write the sync marks 24 (FIG. 4B) within the spiral tracks $20_0$–$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 3:
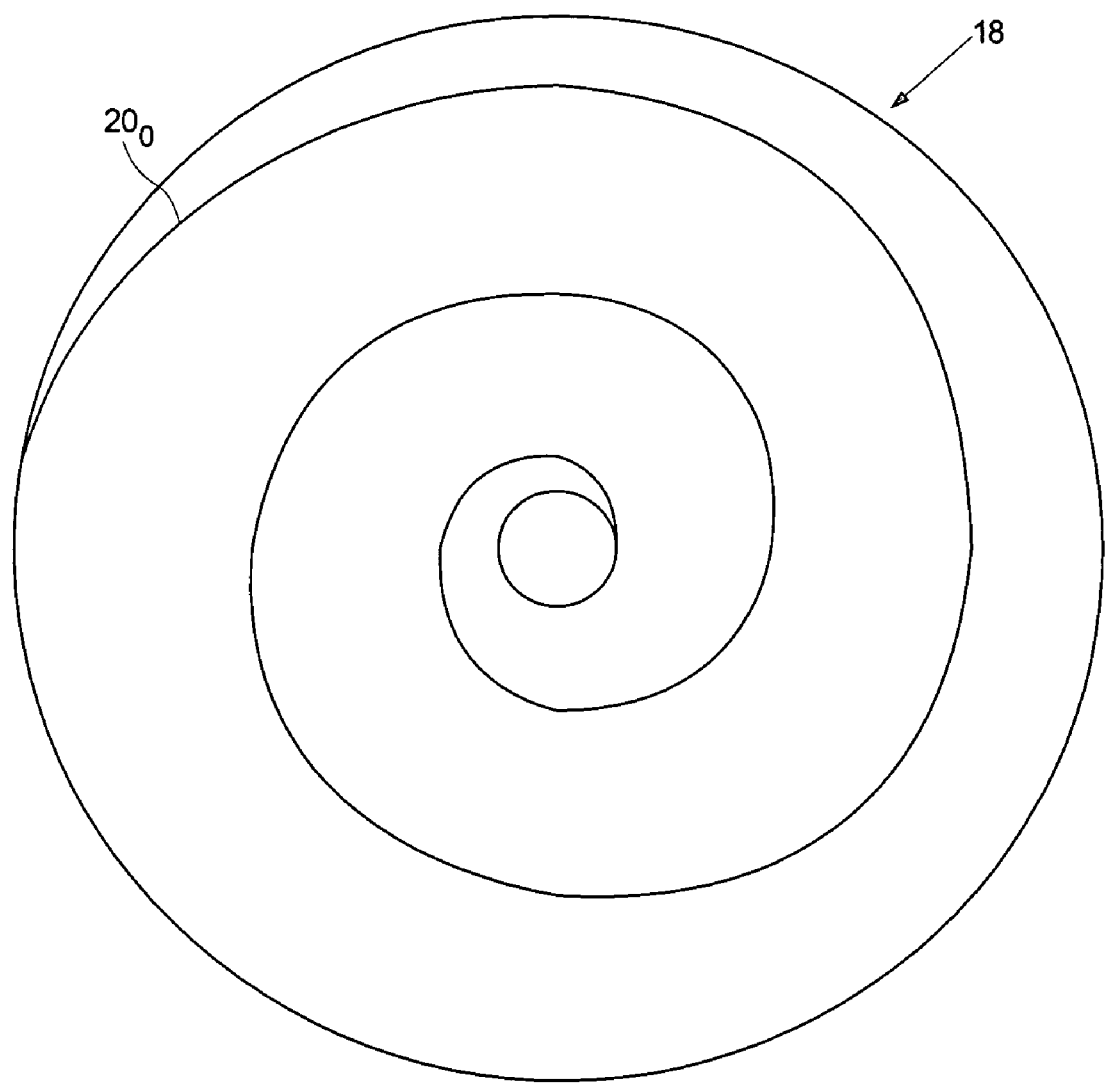
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$–$20_N$ to a number of disks 18, and one or more of the disks 18 are then inserted into an HDA 32.

Referring again to the embodiment of FIG. 2A, after the external spiral servo writer 36 writes the spiral tracks $20_0$–$20_N$ to the disk 18, the head positioning pin 40 and clock head 46 are removed from the HDA 32 and the product servo sectors are written to the disk 18 during a "fill operation". In one embodiment, the control circuitry 34 within the disk drive 16 is used to process the spiral tracks $20_0$–$20_N$ in order to write the product servo sectors to the disk 18. In an alternative embodiment described below with reference to FIGS. 17 and 18, an external product servo writer is used to process the spiral tracks $20_0$–$20_N$ in order to write the product servo sectors to the disk 18.

As described in greater detail below, during the fill operation the spiral tracks are read using the head 28 internal to the disk drive 16 to generate a read signal. The read signal is processed to synchronize a servo write clock and to generate a position error signal (PES) according to a PES algorithm. The position error signal is used to maintain the head 28 along a first servo track while writing product servo sectors along the first servo track. The PES algorithm is adjusted to seek the head 28 to a second servo track, and the head 28 is used to write product servo sectors along the second servo track.

FIG. 4B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$–$20_N$ are detected at a target modulo-N count value. The servo write clock may be generated using any suitable circuitry, such as a phase locked loop (PLL). As each sync mark 24 in the spiral tracks $20_0$–$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

Figure 1:
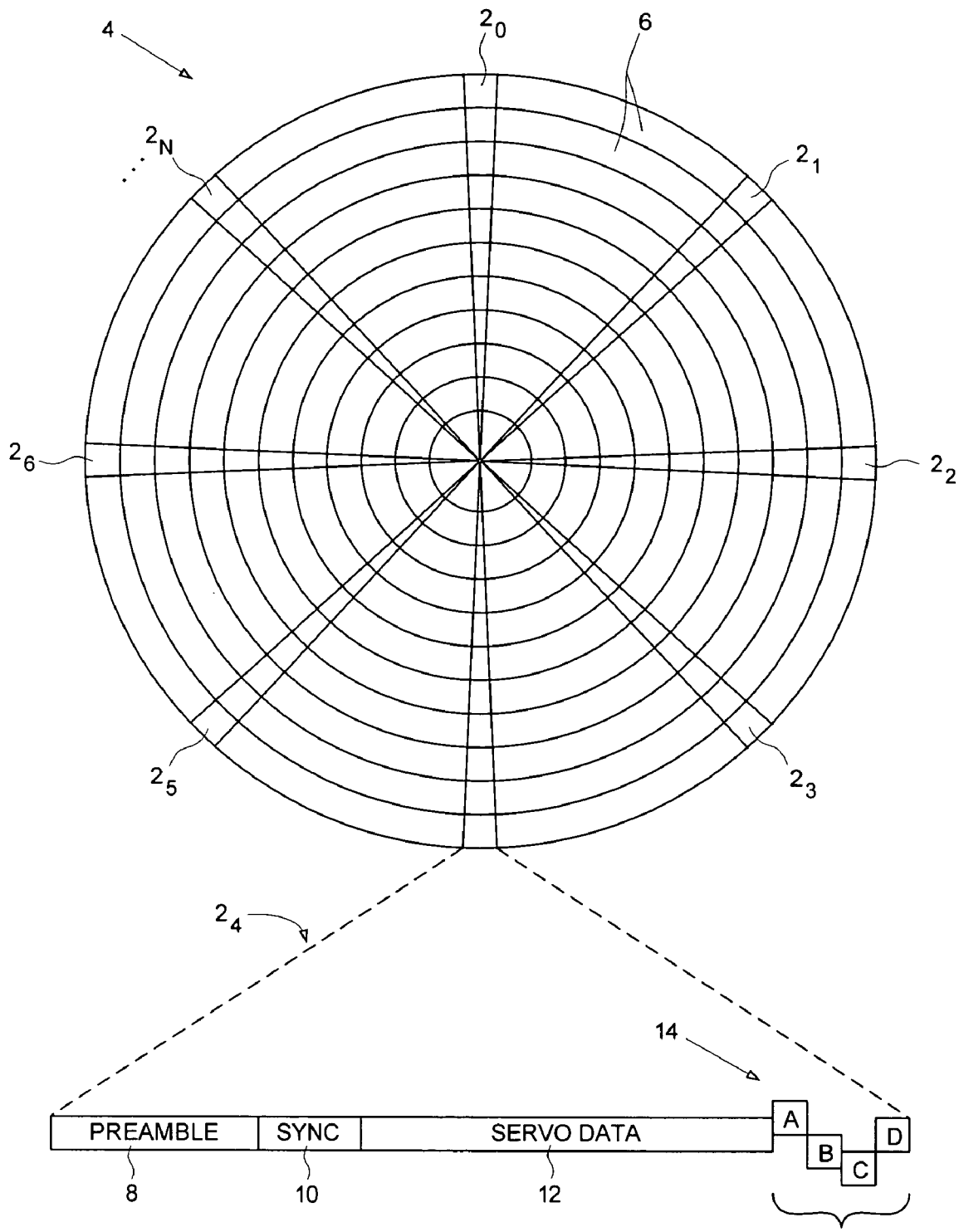
FIG. 1 shows a prior art disk format comprising a plurality of radially spaced, concentric tracks defined by a plurality of product servo sectors.

The sync marks 24 in the spiral tracks $20_0$–$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$–$20_N$ to be written to the disk 18 using a steeper slope (by moving the head faster from the outer diameter to the inner diameter of the disk 18) which reduces the time required to write each spiral track $20_0$–$20_N$.

In one embodiment, the servo write clock is further synchronized by generating a timing recovery measurement from the high frequency signal 22 between the sync marks 24 in the spiral tracks $20_0$–$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
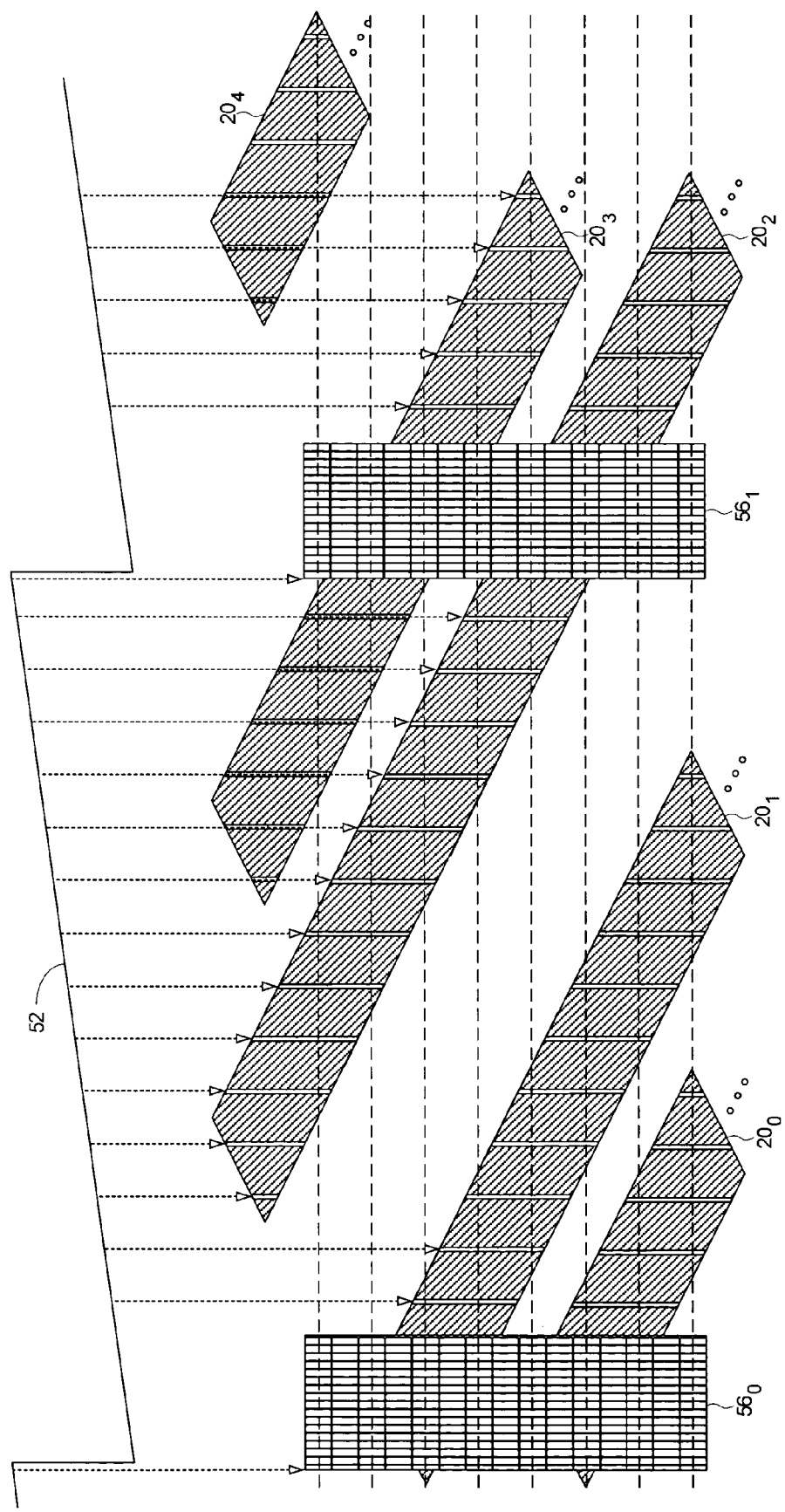
FIG. 5 illustrates writing of product servo sectors using a servo write clock generated from reading the spiral tracks.

FIG. 5 illustrates how the product servo sectors $56_0$–$56_N$ are written to the disk 18 after synchronizing the servo write clock in response to the high frequency signal 22 and the sync marks 24 in the spiral tracks $20_0$–$20_N$. In the embodiment of FIG. 5, the dashed lines represent the centerlines of the data tracks. The sync marks in the spiral tracks $20_0$–$20_N$ are written so that there is a shift of two sync marks 24 in the eye pattern (FIG. 4B) between data tracks. In an alternative embodiment, the sync marks 24 in the spiral tracks $20_0$–$20_N$ are written so that there is a shift of N sync marks in the eye pattern between data tracks. In the embodiment of FIG. 5, the data tracks are narrower than the spiral tracks 20, however, in an alternative embodiment the data tracks are wider than or proximate the width of the spiral tracks 20.

The PES for maintaining the head 28 along a servo track (tracking) may be generated from the spiral tracks $20_0$–$20_N$ in any suitable manner. Once the head 28 is tracking on a servo track, the product servo sectors $56_0$–$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$–$20_N$ on the disk are processed in an interleaved manner to account for the product servo sectors $56_0$–$56_N$ overwriting a spiral track. For example, when writing the product servo sectors $56_1$ to the disk, spiral track $20_2$ is processed initially to generate the PES tracking error and the timing recovery measurement. Just before the product servo sectors $56_1$ begin to overwrite spiral track $20_2$, spiral track $20_3$ is processed to generate the PES tracking error and the timing recovery measurement. In the embodiment of FIG. 5, the spiral tracks 20 are written as pairs to facilitate the interleave processing; however, the spiral tracks may be written using any suitable spacing (e.g., equal spacing) while still implementing the interleaving aspect.

Figure 6A:
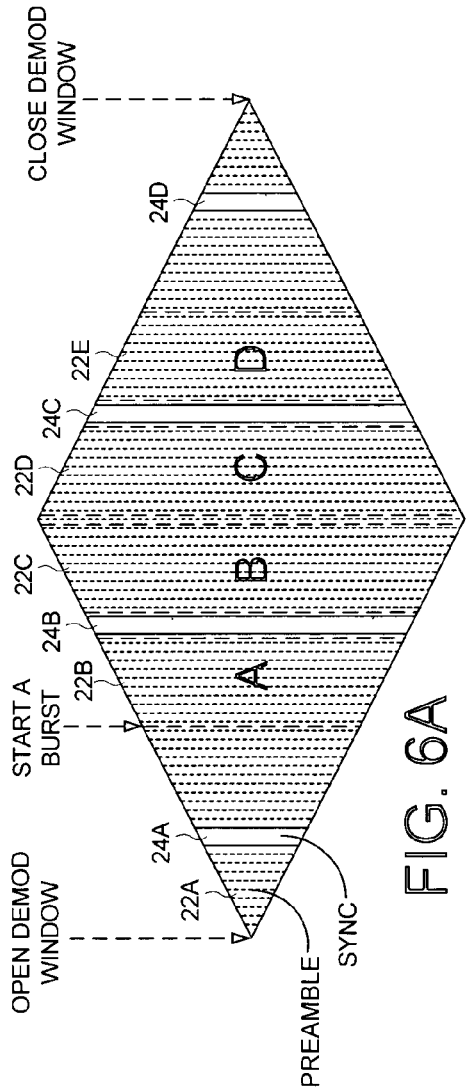
FIGS. 6A–6B illustrate how in one embodiment the control circuitry for demodulating the servo bursts in product servo sectors is also used to demodulate the high frequency signal in the spiral tracks as servo bursts to generate the PES for tracking.
Figure 6B:
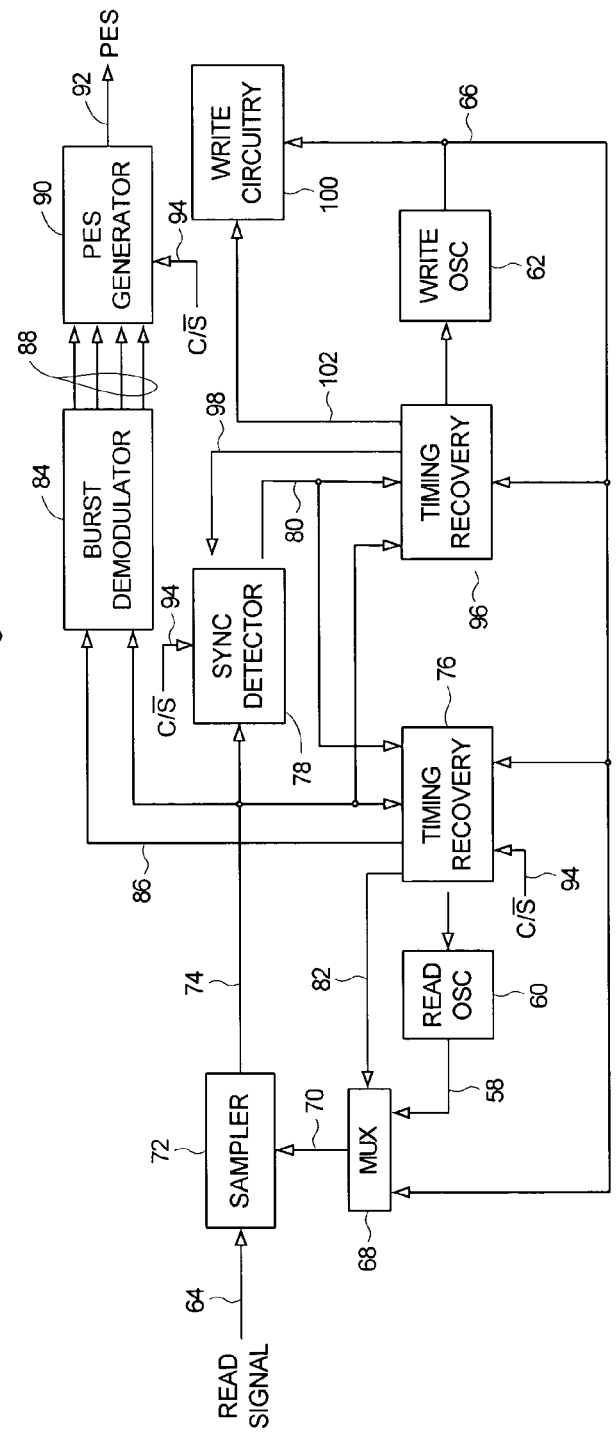

FIGS. 6A–6B illustrate an embodiment of the present invention wherein control circuitry for demodulating the servo bursts in prior art product servo sectors is also used to demodulate the high frequency signal in the spiral tracks 20 as servo bursts to generate the PES for tracking. FIG. 6A shows the eye pattern of FIG. 4B which is processed similar to the prior art product servo sector shown in FIG. 1. The servo write clock is used to open a demodulation window as the head approaches a spiral track. The first segment 22A of the high frequency signal in the eye pattern of FIG. 6A is processed as a preamble similar to the preamble 8 in FIG. 1 for synchronizing to the read signal. The first sync mark 24A in the eye pattern is processed similar to the sync mark 10 in FIG. 1. The following segments 22B–22E of the high frequency signal in the eye pattern are demodulated as servo bursts used to generate the PES for tracking.

FIG. 6B shows example control circuitry for demodulating the prior art product servo sector of FIG. 1 as well as the eye pattern (FIG. 6A) of the spiral tracks 20. The embodiment employs a read oscillator 60 and a write oscillator 62. The read oscillator 60 generates a read clock 58 for sampling the read signal 64 during normal operation when demodulating the product servo sectors 56 and user data recorded on the disk. The write oscillator 62 generates the servo write clock 66 used to write the product servo sectors 56 to the disk during the fill operation. The write oscillator 62 is also used to sample the read signal 64 when demodulating the servo bursts from the high frequency signal 22 in the spiral tracks 20. When the head 28 approaches a spiral track 20 as determined from the servo write clock 66, a demodulation window is opened for demodulating the high frequency signal 22 in the spiral track 20 to generate the position error signal used for tracking.

In one embodiment, after opening the demodulation window the read clock 58 samples the read signal 64 when reading the first segment 22A of the high frequency signal representing the preamble as well as the first sync mark 24A in the eye pattern (FIG. 6A) of the spiral tracks 20. The read clock 58 is selected by multiplexer 68 as the sampling clock 70 for sampling 72 the read signal 64. A first timing recovery circuit 76 opens the demodulation window at the appropriate time as determined from the servo write clock 66, and then processes the read signal sample values 74 to generate a timing recovery signal used to adjust the read oscillator 60 until the read clock 58 is sampling the preamble 22A synchronously. Once locked onto the preamble 22A, a sync detector 78 is enabled for detecting the sync mark 24A in the eye pattern. When the sync detector 78 detects the sync mark 24A, it activates a sync detect signal 80. The first timing recovery circuit 76 responds to the sync detect signal 80 by configuring the multiplexer 68 over line 82 to select the servo write clock 66 as the sampling clock 70. The first timing recovery circuit 76 enables a timer for timing an interval between the sync mark 24A and the start of the A servo burst 22B in the eye pattern. When the timer expires, the first timing recovery circuit 76 enables a burst demodulator 84 over line 86 for demodulating the A, B, C and D servo bursts in the eye pattern from the read signal sample values 74. In one embodiment, the demodulation window comprises a plurality of servo burst windows (square waves) corresponding to the intervals for demodulating the A, B, C and D servo bursts.

In one embodiment, the burst demodulator 84 rectifies and integrates the rectified read signal sample values 74 representing the respective A, B, C and D servo bursts to generate respective servo burst signals 88 which correspond to integrating the A, B, C and D servo bursts 14 in the prior art product servo sector of FIG. 1. A PES generator 90 processes the servo burst signals 88 to generate a PES signal 92 used for tracking. The PES generator 90 may compare the servo burst signals 88 to generate the PES signal 92 using any suitable algorithm when demodulating the servo bursts in either the prior art product servo sectors of FIG. 1 or the eye pattern of FIG. 6A. In one embodiment, the PES signal 92 when reading the eye pattern of FIG. 6A is generated according to $(A-D)/(A+D)$. In this embodiment, evaluating the servo bursts near the edges of the eye pattern increases the sensitivity of the PES measurement. This is because deviations in the radial location of the head 28 cause a more precipitous change in the servo burst values at the edges of the eye pattern as compared to the servo burst values near the center of the eye pattern.

In the embodiment of FIG. 6B, a control signal C/S 94 configures the first timing recovery circuit 76, the sync detector 78, and the PES generator 90 depending on whether the control circuitry is configured for demodulating the product servo sector (prior art product servo sector of FIG. 1) or the spiral tracks. The first timing recovery circuit 76 adjusts the timing between the detection of the sync mark (10 in FIGS. 1 and 24A in FIG. 6A) and the start of the A servo burst (14 in FIGS. 1 and 22B in FIG. 6A). The sync detector 78 adjusts the target sync pattern depending on whether the sync mark 10 in the product servo sector is being detected or the sync mark 24A in the eye pattern of the spiral track. The PES generator 90 adjusts the algorithm for comparing the servo burst signals 88 depending on whether the servo bursts 14 in the product servo sectors are being demodulated or the servo bursts 22B–22E in the eye pattern of the spiral track are being demodulated.

The control circuitry in the embodiment of FIG. 6B further comprises a second timing recovery circuit 96 for generating a timing recovery measurement that controls the write oscillator 62 for generating the servo write clock 66. The second timing recovery circuit 96 comprises the modulo-N counter which is synchronized to the sync marks 24 in the spiral tracks 20. When servoing on the spiral tracks 20, the second timing recovery circuit 96 enables a sync mark detection window over line 98 commensurate with the modulo-N counter approaching a value corresponding to the expected occurrence of a sync mark 24 in a spiral track. When a sync mark 24 is actually detected over line 80, the second timing recovery circuit 96 generates a coarse timing recovery measurement as the difference between the expected value of the module-N counter and the actual value. When reading the high frequency signal 22 in the spiral tracks, the second timing recovery circuit 96 generates a fine timing recovery measurement using any suitable timing recovery algorithm. For example, the fine timing recovery measurement can be generated using a suitable timing gradient, a suitable trigonometric identity, or a suitable digital signal processing algorithm such as the Discrete Fourier Transform (DFT). The coarse and fine timing recovery measurements are combined and used to adjust the write oscillator 62 in order to maintain synchronization of the servo write clock 66.

The servo write clock 66 is applied to write circuitry 100 used to write the product servo sectors 56 to the disk during the fill operation. The second timing recovery circuit 96 generates a control signal 102 for enabling the write circuitry 100 at the appropriate time so that the product servo sectors 56 are written at the appropriate circumferential location from the outer diameter of the disk to the inner diameter of the disk. In one embodiment, the control signal 102 enables the write circuitry 100 each time the module-N counter reaches a predetermined value so that the product servo sectors 56 form servo wedges as illustrated in FIG. 1 and FIG. 5.

Although the first timing recovery circuit 76 and second timing recovery circuit 96 in FIG. 6B adjust the frequency of sampling clock 70 until the read signal 64 is sampled 72 synchronously, any suitable timing recovery technique may be employed. In an alternative embodiment, interpolated timing recovery is employed. With interpolated timing recovery the read signal 64 is sampled asynchronously and interpolated to generate the synchronous sample values 74.

Figure 7A:
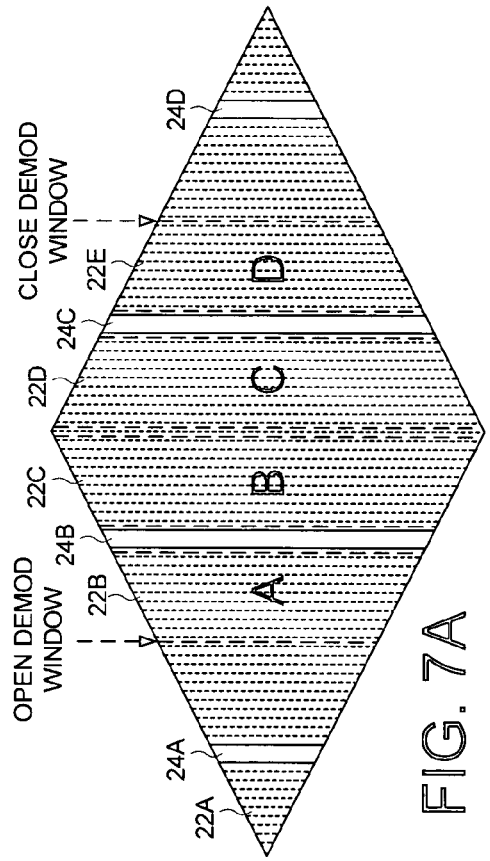
FIGS. 7A–7B shows an embodiment wherein the control circuitry of FIGS. 6A–6B is modified so that the servo write clock samples the read signal over the entire eye pattern (including the servo bursts) in order to maintain synchronization.
Figure 7B:
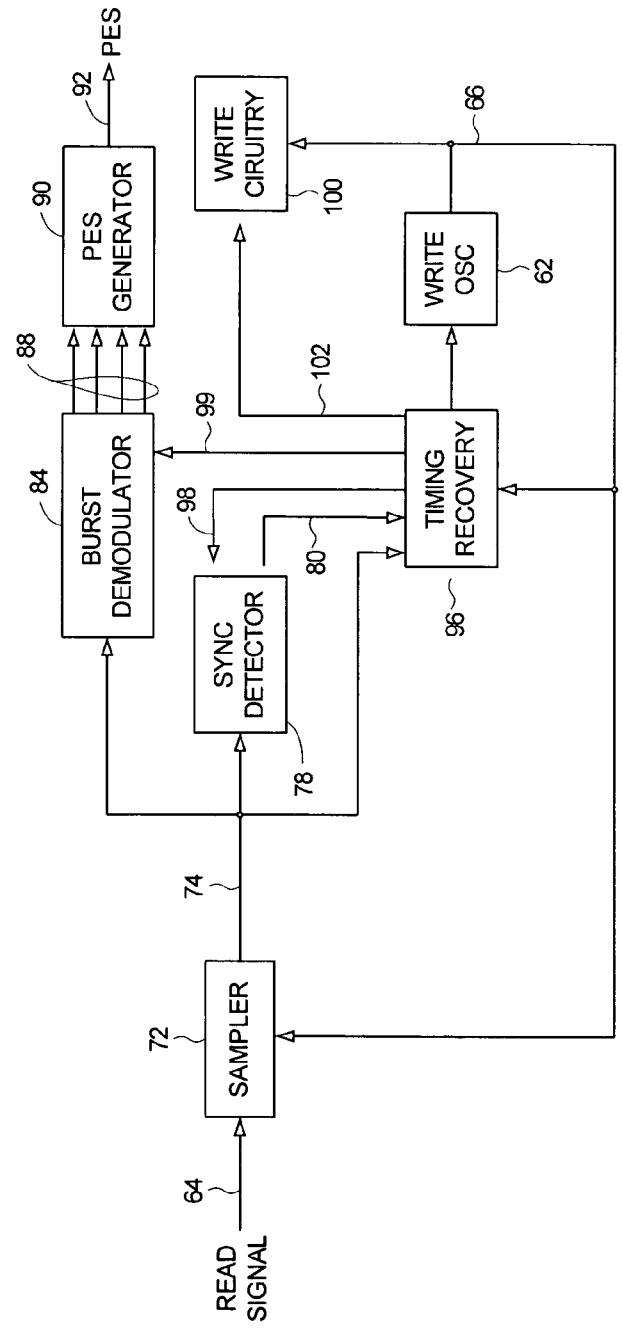

In an alternative embodiment shown in FIGS. 7A and 7B, the servo write clock 66 is used to sample the read signal over the entire eye pattern (spiral track crossing). The timing recovery circuitry 96 in FIG. 7B opens the demodulation window at the start of the A servo burst 22B and closes the demodulation window at the end of the D servo burst 22E as determined from the servo write clock 66. In one embodiment, the timing recovery circuitry 96 generates servo burst windows within the demodulation window corresponding to the intervals for demodulating the A, B, C and D servo bursts.

Figure 8A:
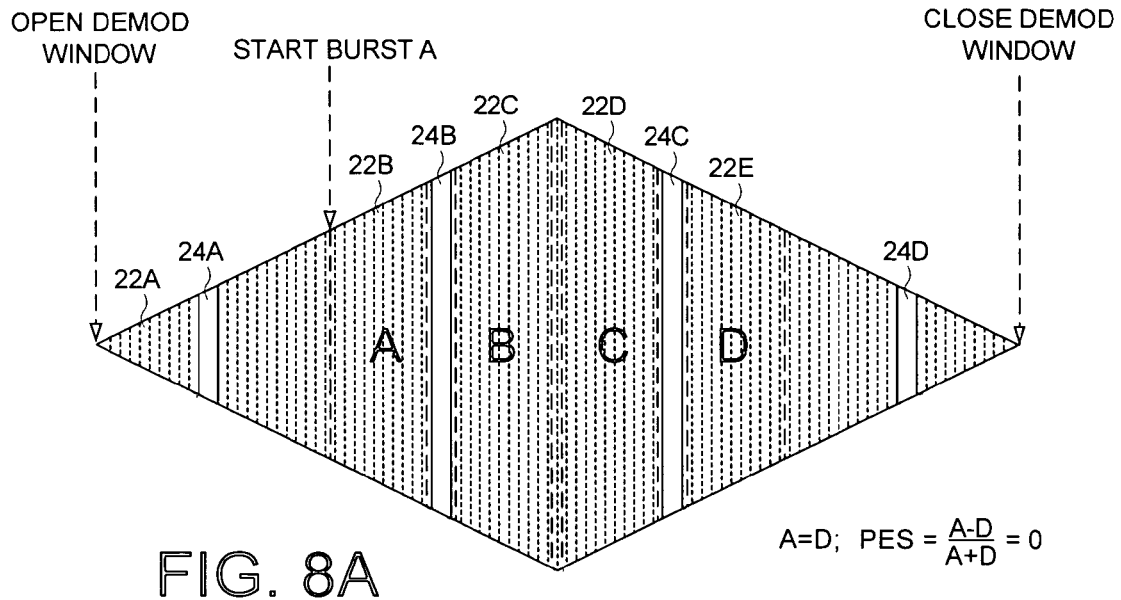
FIGS. 8A–8B show an embodiment of the present invention for calibrating the correlation between the PES generated from reading the spiral tracks and off-track displacement.
Figure 8B:
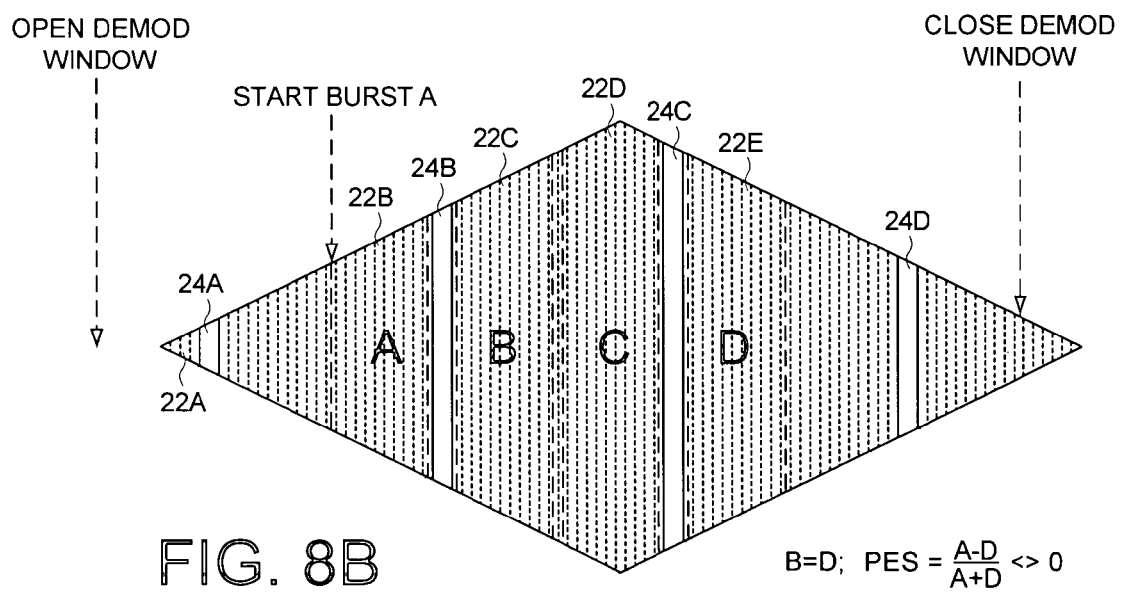

FIGS. 8A and 8B illustrate an embodiment of the present invention for calibrating the correlation between the PES generated from demodulating the spiral tracks 20 and the off-track displacement of the head 28. The segments 22B–22E of the high frequency signal in the spiral tracks 20 are demodulated as servo bursts to generate corresponding servo burst signals A, B, C and D. A PES is generated by comparing the servo burst signals according to any suitable algorithm, such as (A−D)/(A+D). As shown in FIG. 8A, when the head 28 is on track a predetermined relationship between the servo burst signals (e.g., A=D) generates a predetermined value for the PES (e.g., zero). The head 28 is then moved away from the center of the track until the servo burst signals reach a second predetermined relationship (e.g., B=D) as shown in FIG. 8B. When the servo burst signals reach the second predetermined relationship, the shift in the eye pattern relative to the sync marks 24A–24D is known and therefore the amount of off-track displacement is known. Measuring the PES when the servo burst signals reach the second predetermined relationship provides the correlation (assuming a linear relationship) between the PES and the amount of off-track displacement.

Figure 9A:
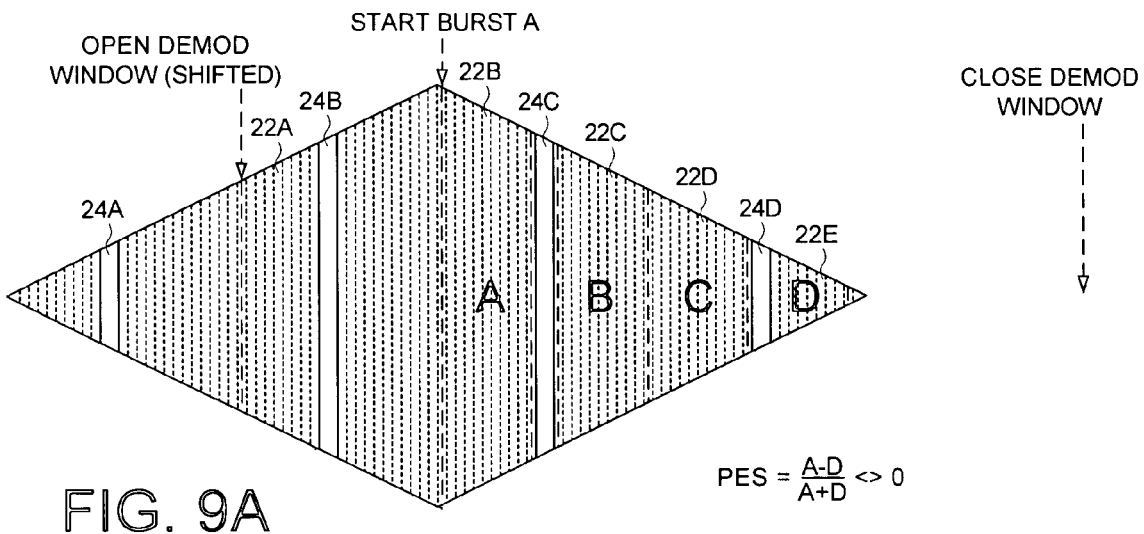
FIGS. 9A–9C illustrate a seek operation to a next servo track by shifting the demodulation window an integer number of sync mark intervals to generate a non-zero PES signal.
Figure 9B:
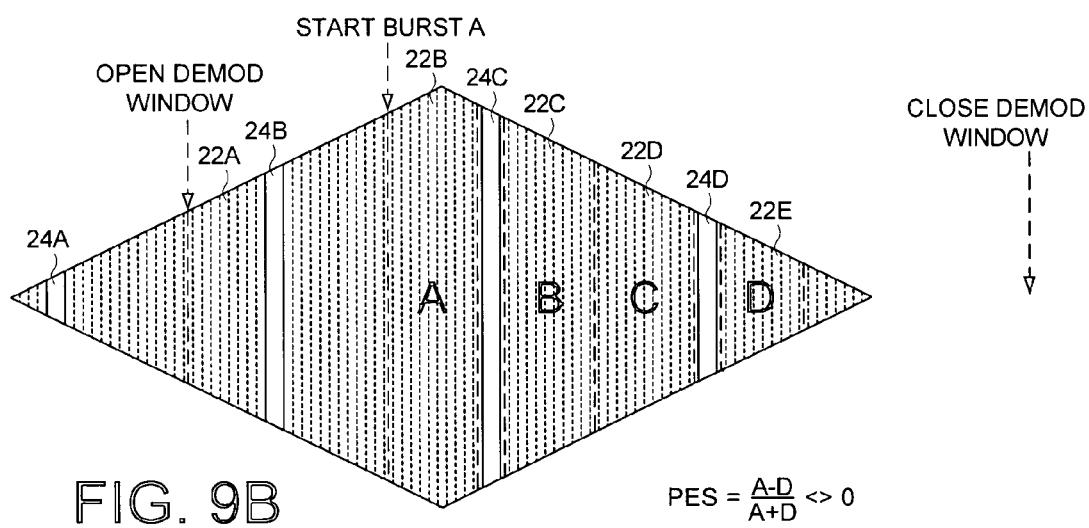
Figure 9C:
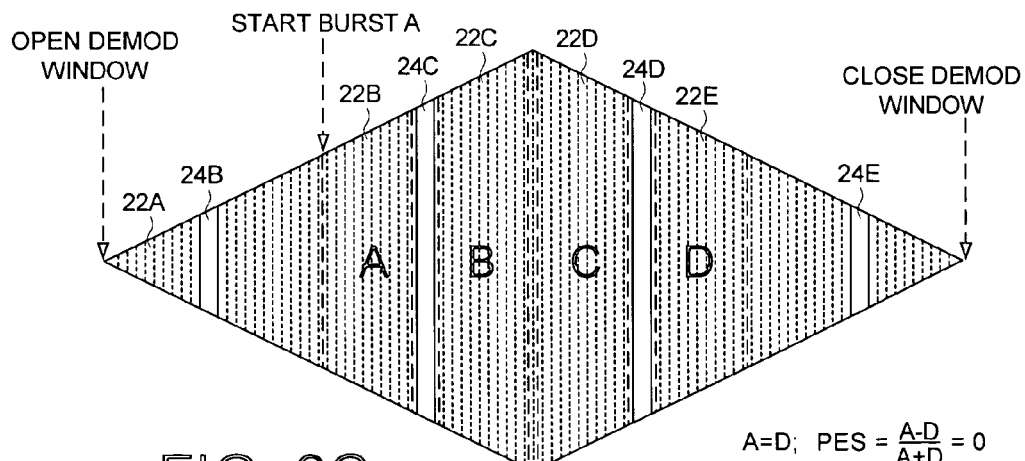

FIGS. 9A–9B illustrate a seek operation from a current servo track to a next servo track by shifting the demodulation window an integer number of sync mark intervals to generate a non-zero PES signal for moving the head toward the next servo track. In the embodiment of FIG. 9A, the demodulation window and corresponding intervals (windows) for the preamble 22A and servo bursts 22B–22E are shifted by one sync mark interval relative to FIG. 8A (i.e., there is a shift of one sync mark per servo track). After synchronizing to the preamble 22A, sync mark 24B is detected to enable the timer for timing the interval between the sync mark 24B and the start of the A servo burst 22B. The servo bursts 22B–22E are then demodulated to generate a non-zero PES which causes the servo control circuitry to move the head 28 toward the next servo track. FIG. 9B illustrates the head 28 moving toward the next servo track and the corresponding shift in the eye pattern and change in the PES. FIG. 9C illustrates the end of the seek operation after the head 28 reaches the next servo track and the eye pattern has shifted such that the A servo burst 22B equals the D servo burst 22E resulting in a zero PES.

Defining the servo track width as a shift in an integer number of sync marks (one sync mark in the example of FIGS. 9A–9C) simplifies implementation of the seek operation. The servo demodulation window as determined from the servo write clock 66 is simply shifted by an integer number of sync mark intervals to initiate the seek operation. The demodulation window may be shifted any suitable number of sync mark intervals depending on the frequency of the sync marks 24 in the spiral tracks 20 and the desired servo track density.

Figure 10A:
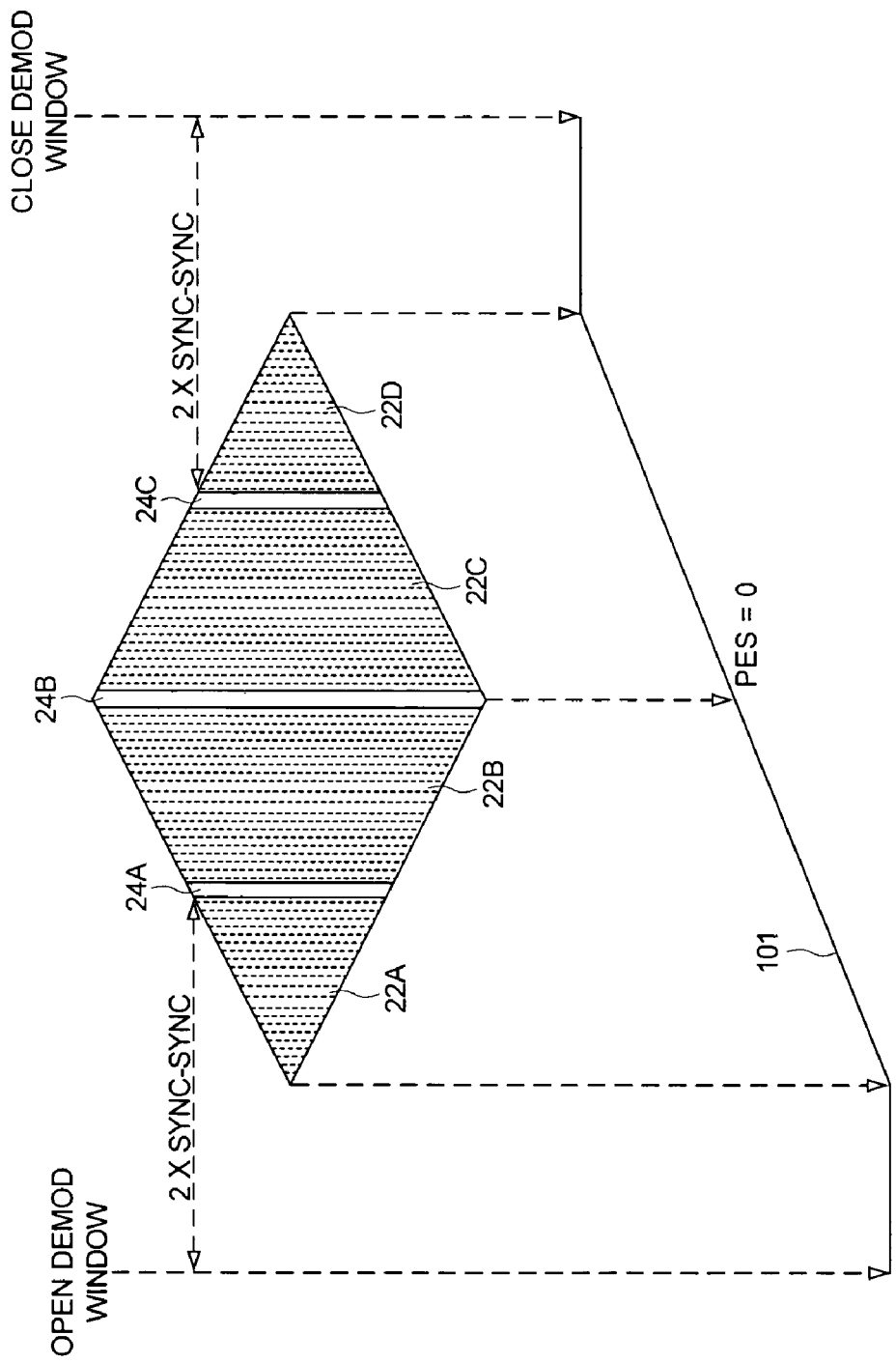
FIG. 10A illustrates an embodiment of the present invention wherein the high frequency signal in the spiral tracks is demodulated by integrating the read signal over the demodulation window and generating the PES relative to a target sync mark and a reference point on the resulting ramp signal.
Figure 10B:
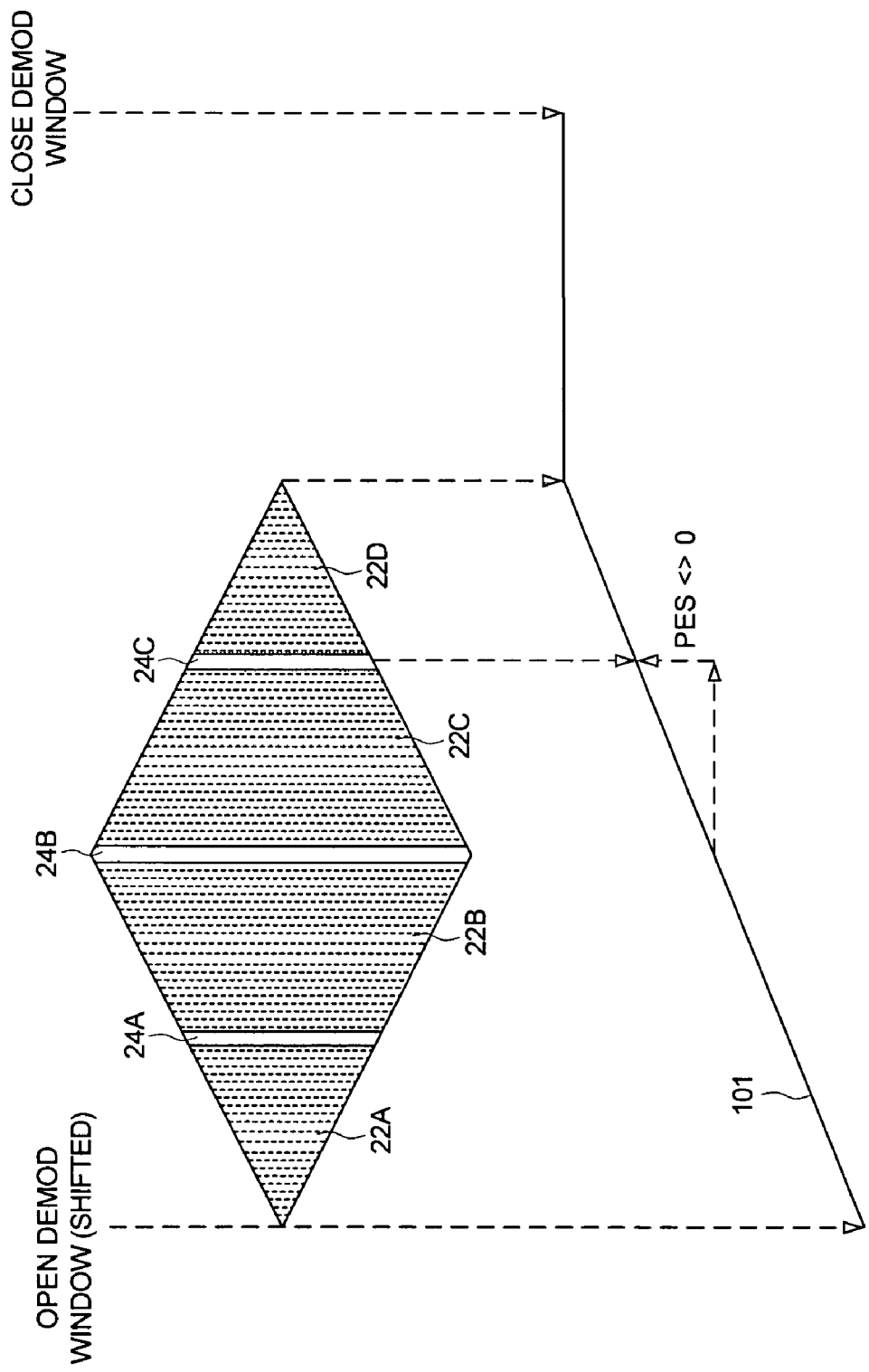
FIG. 10B illustrates initiating a seek operation by shifting the demodulation window an integer number of sync marks to generate a non-zero PES.

The high frequency signal 22 in the spiral tracks 20 may be demodulated using any suitable technique to generate the PES for tracking. FIG. 10A shows an embodiment of the present invention wherein the high frequency signal 22 in a spiral track 20 is demodulated by integrating the read signal to generate a ramp signal 101. The PES is generated relative to a target sync mark 24 in the spiral track 20 and a reference point of the ramp signal 101. In the embodiment of FIG. 10A, there are three sync marks 24A–24C in each spiral track crossing (each eye pattern) and the PES is generated as the deviation of the middle sync mark 24B from the center of the ramp signal 101. This deviation can be computed as the difference in the amplitude of the ramp signal 101 when the middle sync mark 24B is detected, or the difference in time between when the middle sync mark 24B is detected and the middle of the ramp signal 101. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 101 is generated by integrating the high frequency signal 22 between the sync marks 24; that is, integration windows within the demodulation window are generated corresponding to the segments of high frequency signal 22 between each sync mark 24 (as determined from servo write clock 66). FIG. 10B illustrates a seek operation by shifting the demodulation window one sync mark interval to generate a non-zero PES which causes the head 28 to move toward the next servo track. The head 28 is moved radially so that the eye pattern shifts until sync mark 24C is detected in the middle of the eye pattern corresponding to the middle of the ramp signal 101.

Figure 11A:
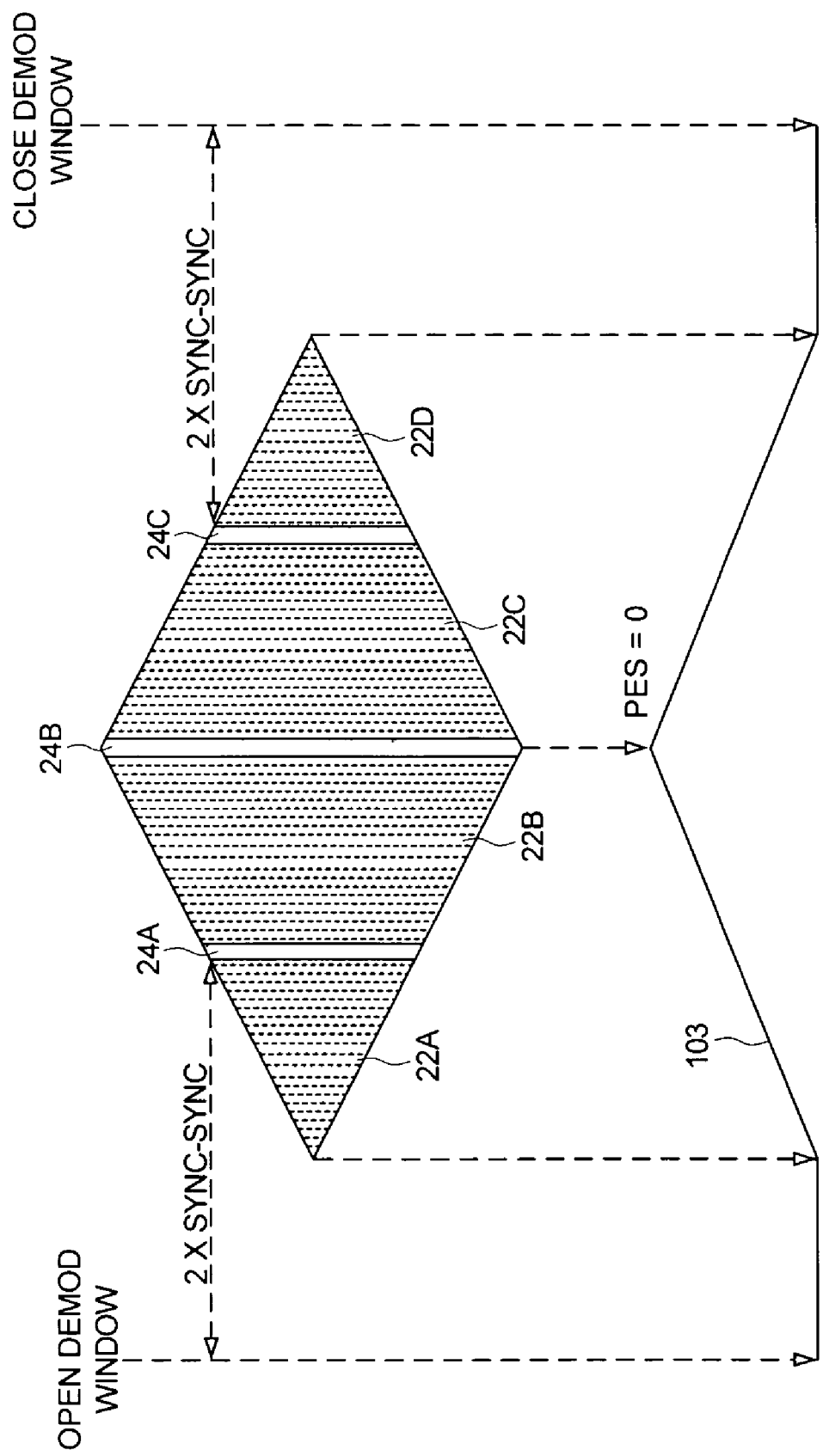
FIG. 11A illustrates an embodiment of the present invention wherein the high frequency signal in the spiral tracks is demodulated by envelope detecting the read signal over the demodulation window and generating the PES relative to a target sync mark and the peak in the envelope signal.

FIG. 11A illustrates yet another embodiment of the present invention wherein the high frequency signal 22 in the spiral tracks 20 is demodulated by generating an envelope signal 103 from the read signal. The PES is generated relative to a target sync mark 24 in the spiral track 20 and a peak in the envelope signal 103. In the embodiment of FIG. 11A, there are three sync marks 24A–24C in each spiral track crossing (each eye pattern) and the PES is generated as the deviation of the middle sync mark 24B from the peak of the envelope signal 103. This deviation can be computed as the difference in the amplitude of the envelope signal 103 when the middle sync mark 24B is detected, or the difference in time between when the middle sync mark 24B is detected and the peak of the envelope signal 103. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). FIG. 11B illustrates a seek operation by shifting the demodulation window one sync mark interval to generate a non-zero PES which causes the head 28 to seek toward the next servo track. The head 28 is moved radially so that the eye pattern shifts until sync mark 24C is detected in the middle of the eye pattern corresponding to the peak of the envelope signal 103.

Figure 12A:
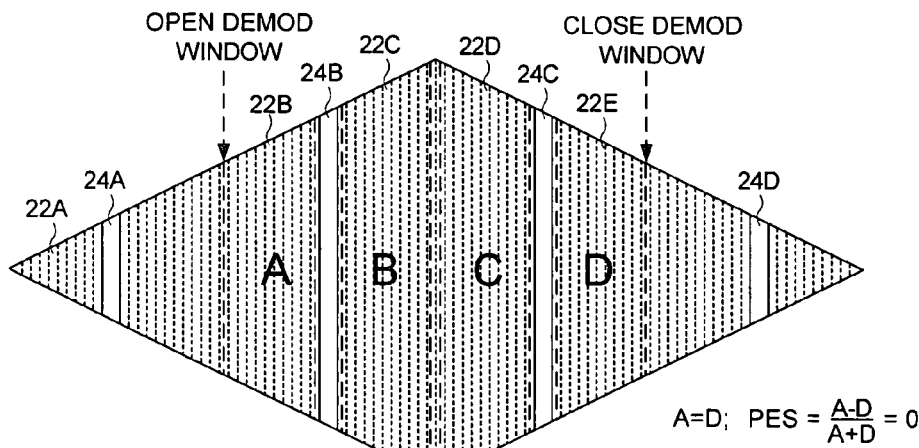
FIGS. 12A–12C show an embodiment of the present invention wherein the PES algorithm is adjusted to attain a finer resolution of track density by adjusting the computing of the difference between the servo bursts.
Figure 12B:
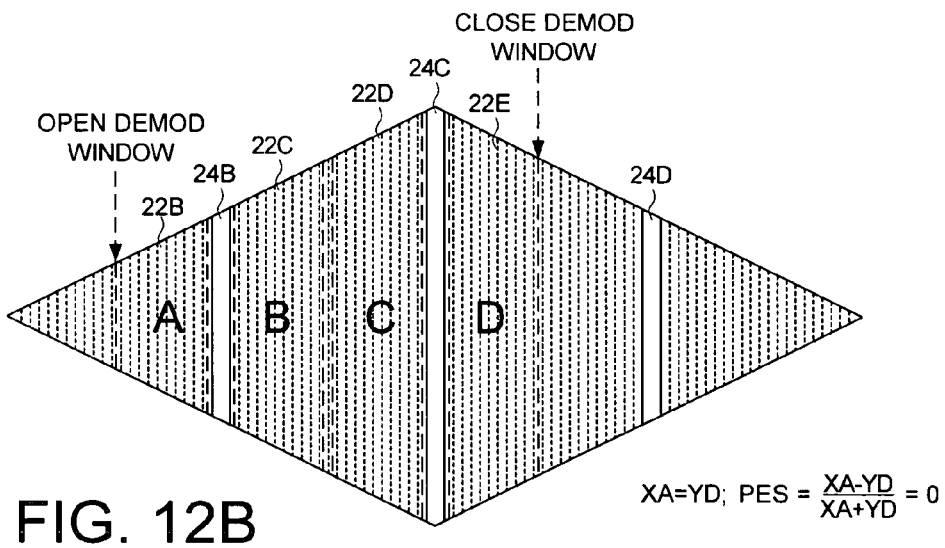
Figure 12C:
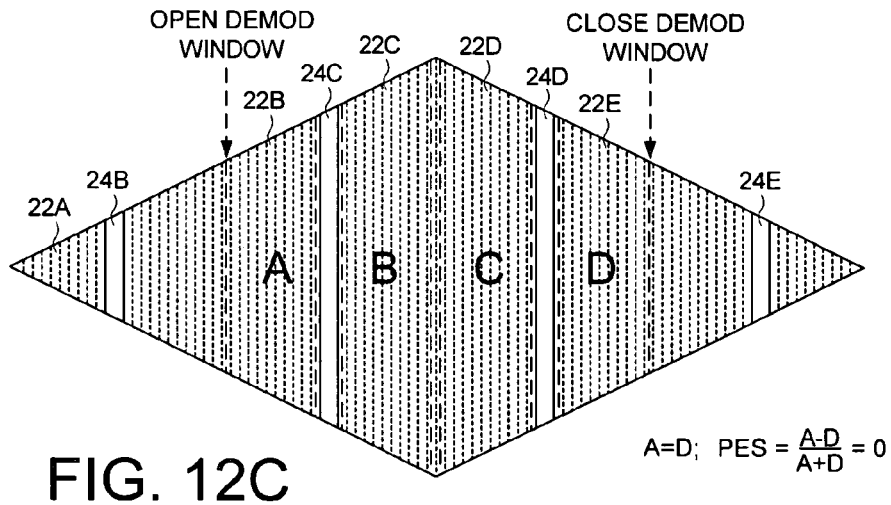

In one embodiment, the PES algorithm for generating the position error signal is adjusted to attain a higher resolution track density as compared to shifting the demodulation window an integer number of sync marks intervals. For example, FIGS. 12A–12C illustrate an embodiment of the present invention wherein the PES algorithm is adjusted by adjusting the computation of the difference between servo bursts. In FIG. 12A, the same PES algorithm is used as in FIG. 8A (A−D)/(A+D) while writing product servo sectors a first servo track. However, rather than shifting the demodulation window a sync mark interval to initiate a seek operation, the PES algorithm is adjusted to seek the head to the next servo track. This is illustrated in FIG. 12B wherein the PES algorithm is adjusted to (XA−YD)/(XA+YD) where X and Y are predetermined scalars. In FIG. 12C, the demodulation window is shifted by a sync mark interval and the PES algorithm is reset to (A−D)/(A+D) in order to seek the head to the next servo track. In this manner the track density is doubled by adjusting the PES algorithm using alternating scalar values {1,1} and {X,Y} as compared to shifting the demodulation window an integer number of sync mark intervals. Note that the track density can be increased to essentially any resolution by adjusting the PES algorithm with different scalar values X and Y for each seek operation. For example, the track density can be tripled by using three scalar values {1,1}, {X1,Y1}, {X2,Y2}, {1,1}, {X1,Y1}, {X2,Y2}, . . .

Figure 13A:
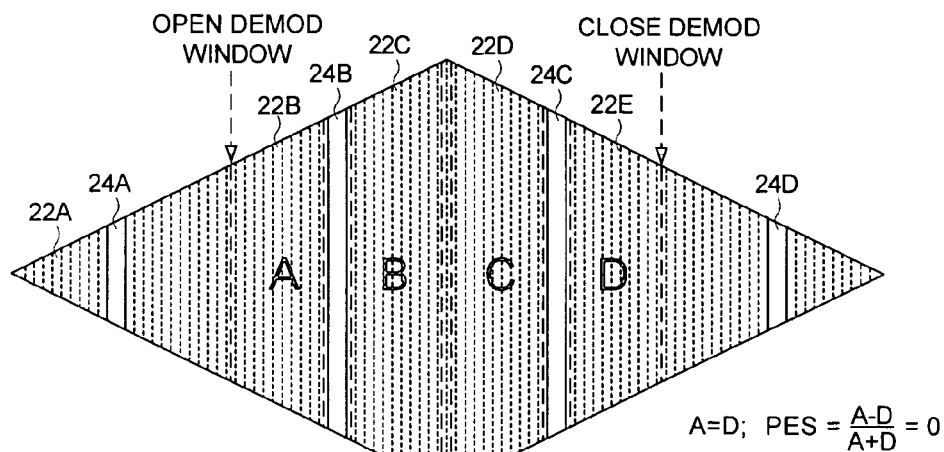
FIGS. 13A–13C show an embodiment of the present invention wherein the PES algorithm is adjusted to attain a finer resolution of track density by shifting the demodulation window a fraction number of a sync mark intervals.
Figure 13B:
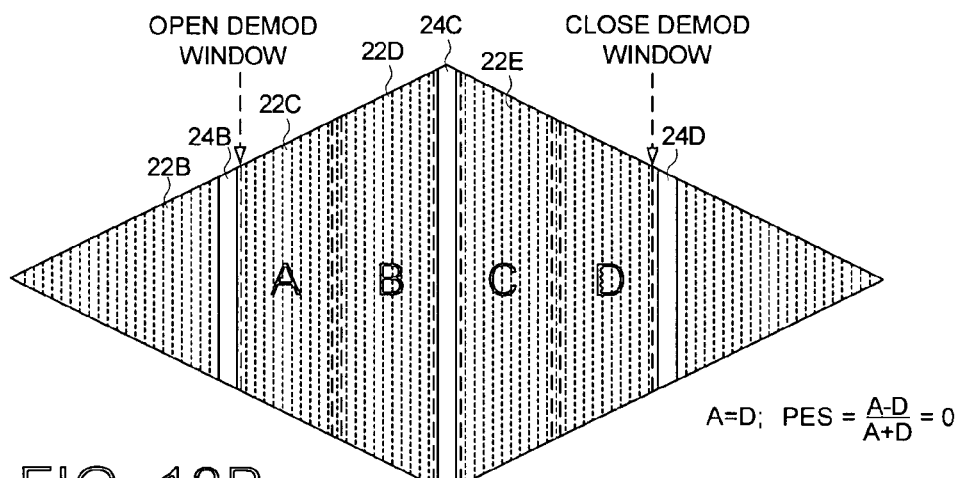
Figure 13C:
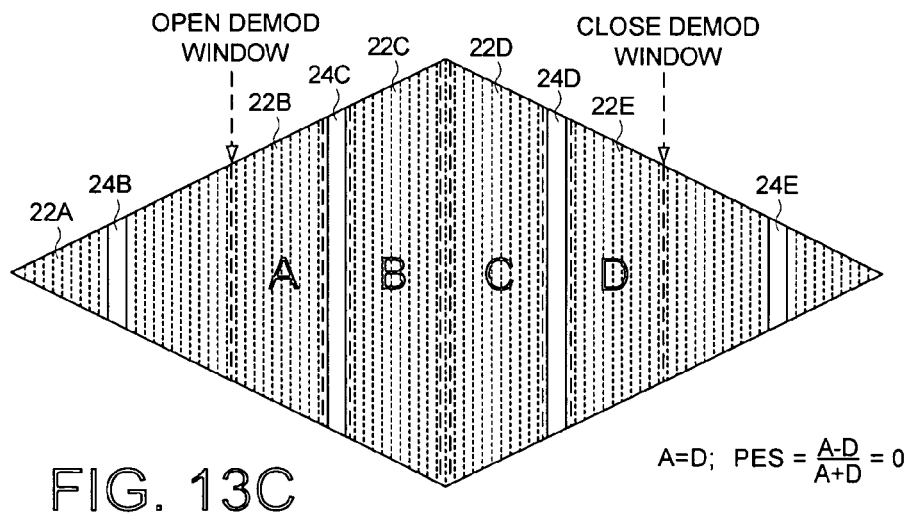

In another embodiment illustrated in FIGS. 13A–13B the PES algorithm is adjusted to increase the track density by shifting the demodulation window a fraction number of a sync mark intervals rather than an integer number of sync mark intervals. FIG. 13A illustrates a tracking operation on a first servo track while writing product servo sectors, FIG. 13B illustrates shifting the demodulation window one-half sync mark interval to seek the head to the next servo track, and FIG. 13C illustrates shifting the demodulation window another one-half sync mark interval to seek the head to the next servo track. In this manner, the track density is doubled as compared to shifting the demodulation window a full sync mark interval for each seek. Note that the track density can be increased to essentially any resolution by appropriately adjusting the fractional amount that the demodulation window is shifted.

Figure 14A:
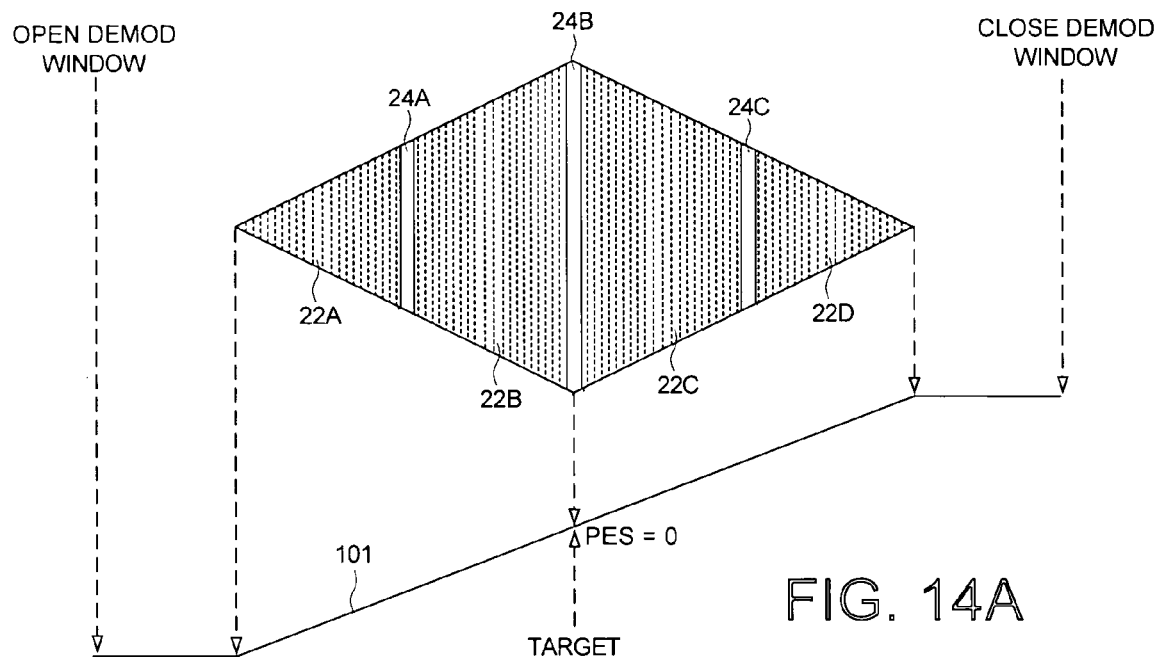
FIGS. 14A–14B show an embodiment of the present invention wherein the PES algorithm is adjusted to attain a finer resolution of track density by adjusting a reference point in a ramp signal generated by integrating the read signal.
Figure 14B:
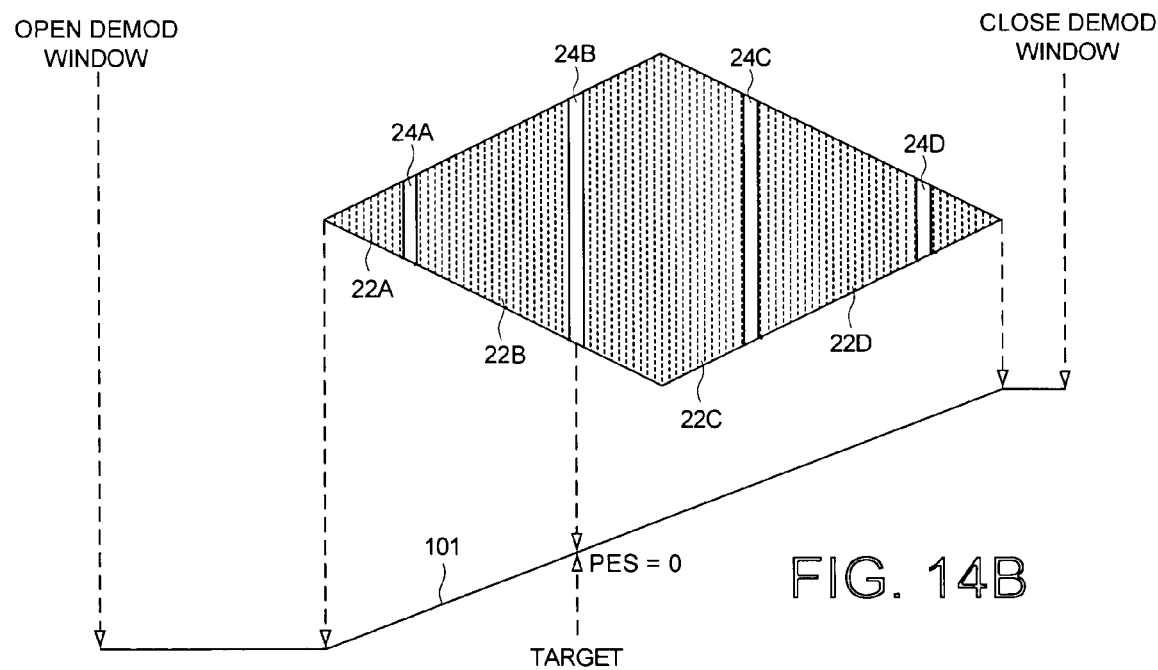

FIGS. 14A and 14B show an embodiment of the present invention for increasing the resolution of the track density when demodulating the high frequency signal in the spiral tracks to generate a ramp signal 101. FIG. 14A illustrates a tracking operation on a first servo track by generating the position error signal relative to a target sync mark 24B and a reference point of the ramp signal 101 (e.g., the center of the ramp signal 101), and FIG. 14B illustrates a seek to a next servo track by adjusting the reference point of the ramp signal 101. Note that the track density can be increased to essentially any resolution by appropriately adjusting the reference point of the ramp signal 101.

Figure 15A:
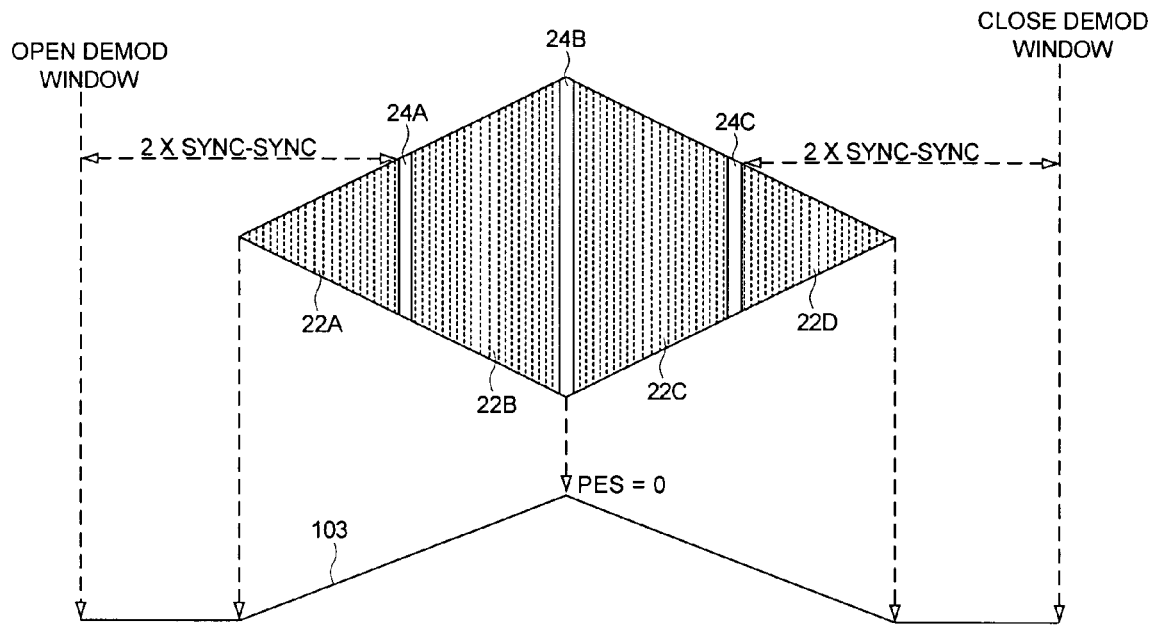
FIGS. 15A–15B show an embodiment of the present invention wherein the PES algorithm is adjusted to attain a finer resolution of track density by adjusting an offset relative a target sync mark and a peak in an envelope signal.
Figure 15B:
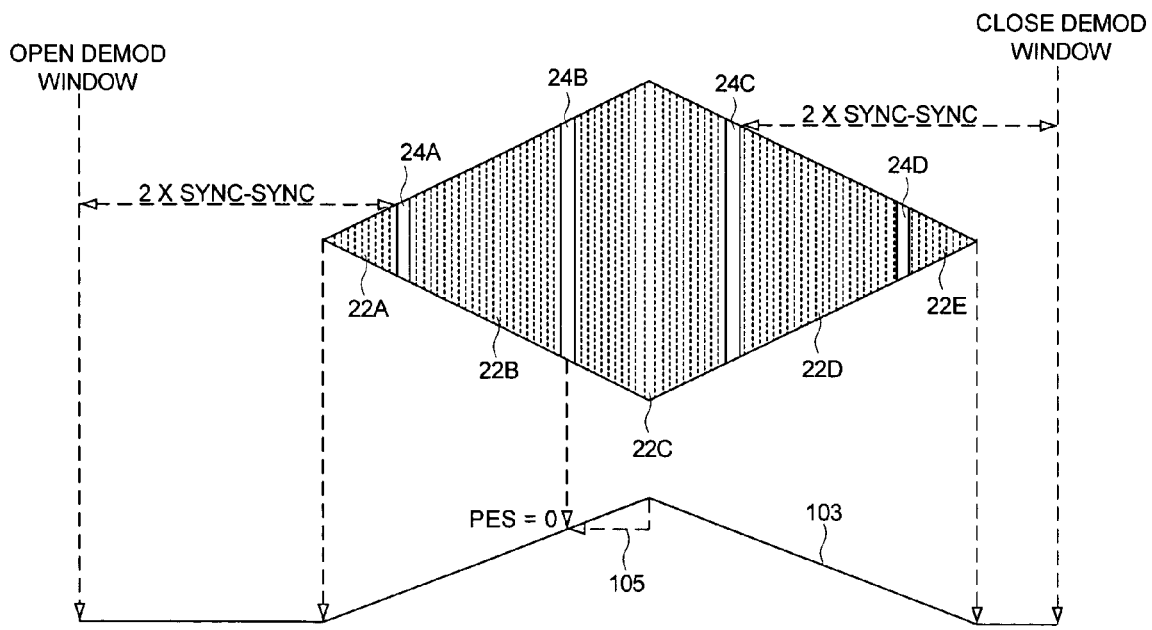

FIGS. 15A and 15B show yet another embodiment of the present invention for increasing the resolution of the track density when demodulating the high frequency signal to generate an envelope signal 103. FIG. 15A illustrates a tracking operation on a first servo track by generating the position error signal relative to a target sync mark 24B and the peak of the envelope signal 103, and FIG. 15B illustrates a seek to a next servo track by adjusting an offset 105 relative to the target sync mark 24B and the peak in the envelope signal 103. The offset 105 may correspond to an offset in amplitude of the envelope signal 103, or a timing offset from the occurrence of the peak in the envelope signal 103. Note that the track density can be increased to essentially any resolution by appropriately adjusting the offset 105.

Figure 16A:
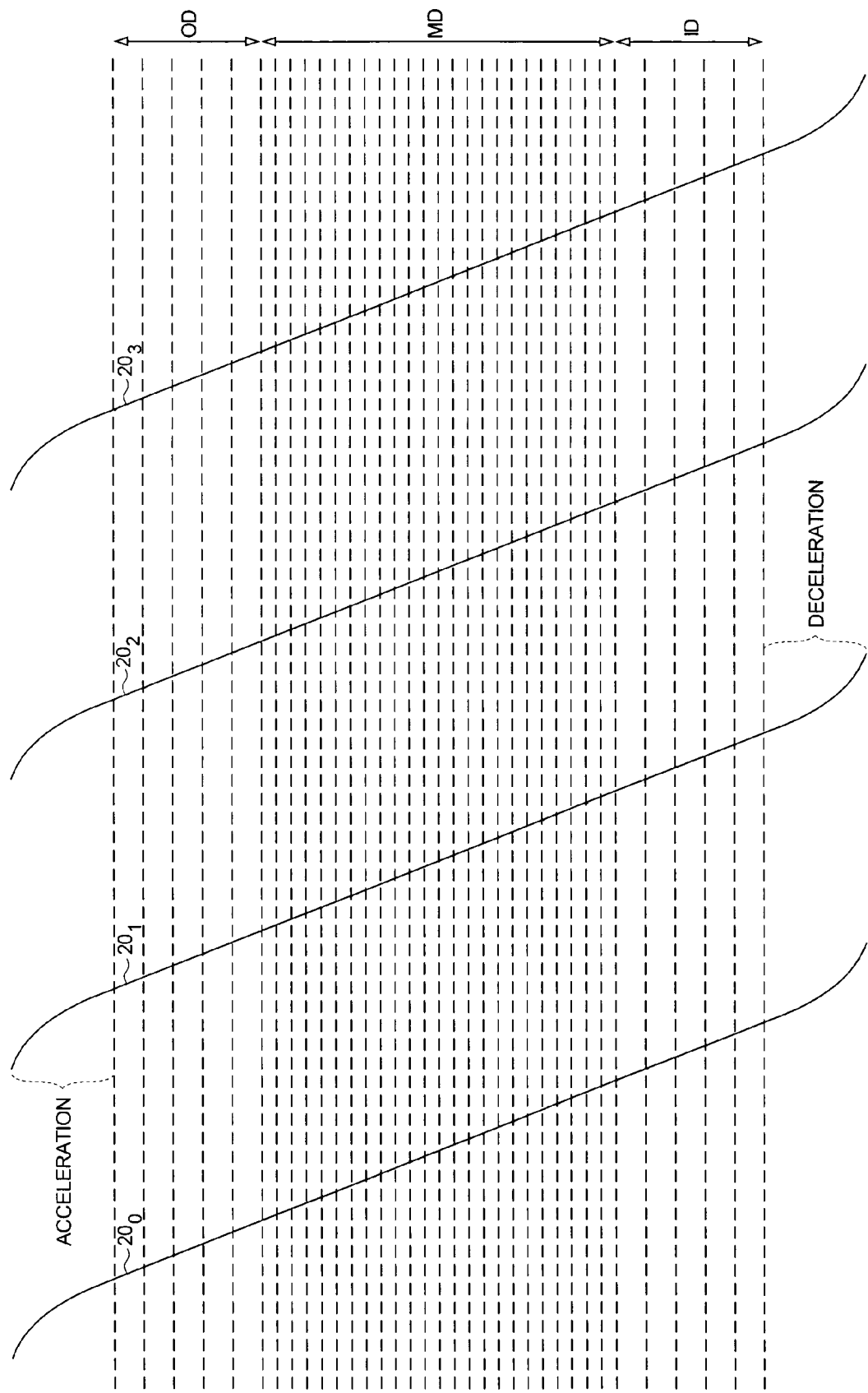
FIG. 16A shows an embodiment of the present invention wherein the PES algorithm is adjusted to decrease the track density over the outer and inner diameter of the disk.

In one embodiment, a target track density is established for the head 28 and disk 18 and the PES algorithm is adjusted in response to the target track density. For example, a SQUASH measurement may determine the combined width of the read/write elements of the head 28 and therefore the optimal track density for the corresponding disk surface. In yet another embodiment, the PES algorithm is adjusted to attain a first density of data tracks over a first radial segment of the disk, and the PES algorithm is adjusted to attain a second density of data tracks over a second radial segment of the disk, wherein the first density is substantially different than the second density. For example, the PES algorithm may be adjusted to decrease the track density near the outer diameter (OD) and inner diameter (ID) as compared to the middle diameter (MD) of the disk 18 as illustrated in FIG. 16A. The variable track density over the disk radius helps compensate for various factors contributing to reproduction degradation, such as misregistration errors at the outer diameter of the disk and inter-track interference at the inner diameter of the disk.

Figure 16B:
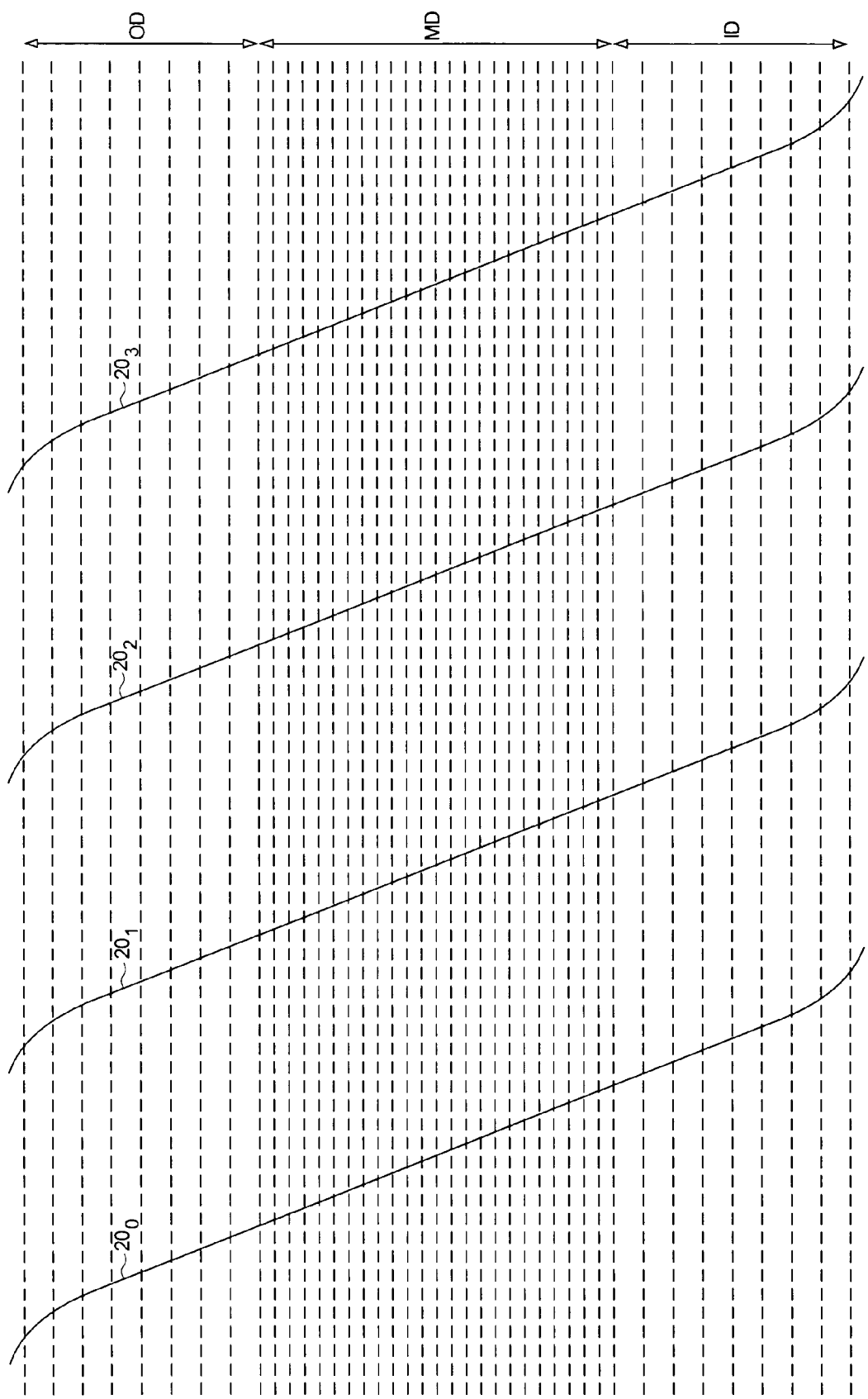
FIG. 16B shows an embodiment of the present invention wherein the PES algorithm is adjusted to compensate for the changing slope of the spiral tracks at the outer and inner diameter thereby extending the number of data tracks to increase capacity.

FIG. 16A also illustrates an embodiment of the present invention wherein the slope of the spiral tracks $20_0$–$20_N$ gradually decreases toward the far outer and inner diameter of the disk due to an acceleration phase and deceleration phase while writing the spiral tracks $20_0$–$20_N$ (e.g., using the external spiral writer 36 of FIG. 2A). In the embodiment of FIG. 16A, product servo sectors 56 that define data tracks are not written over the area of the disk where the slope of the spiral tracks $20_0$–$20_N$ is changing. In an alternative embodiment shown in FIG. 16B, the PES algorithm is adjusted to compensate for the changing slope of the spiral tracks $20_0$–$20_N$ in order to extend the number of data tracks and thereby increase the capacity of the disk.

Figure 17:
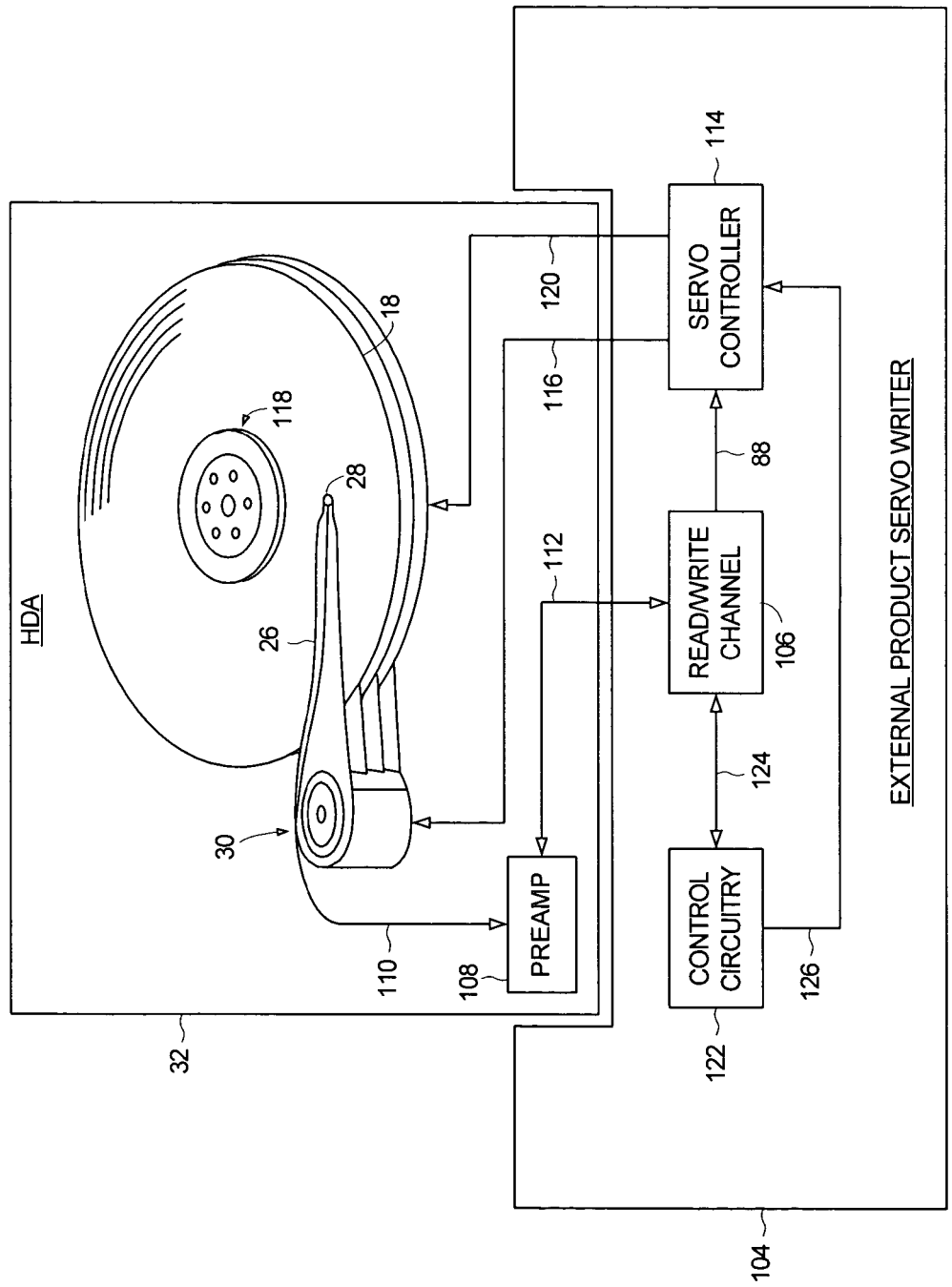
FIG. 17 shows an embodiment of the present invention wherein an external product servo writer is used to process the spiral tracks in order to write the product servo sectors to the disk.
Figure 18:
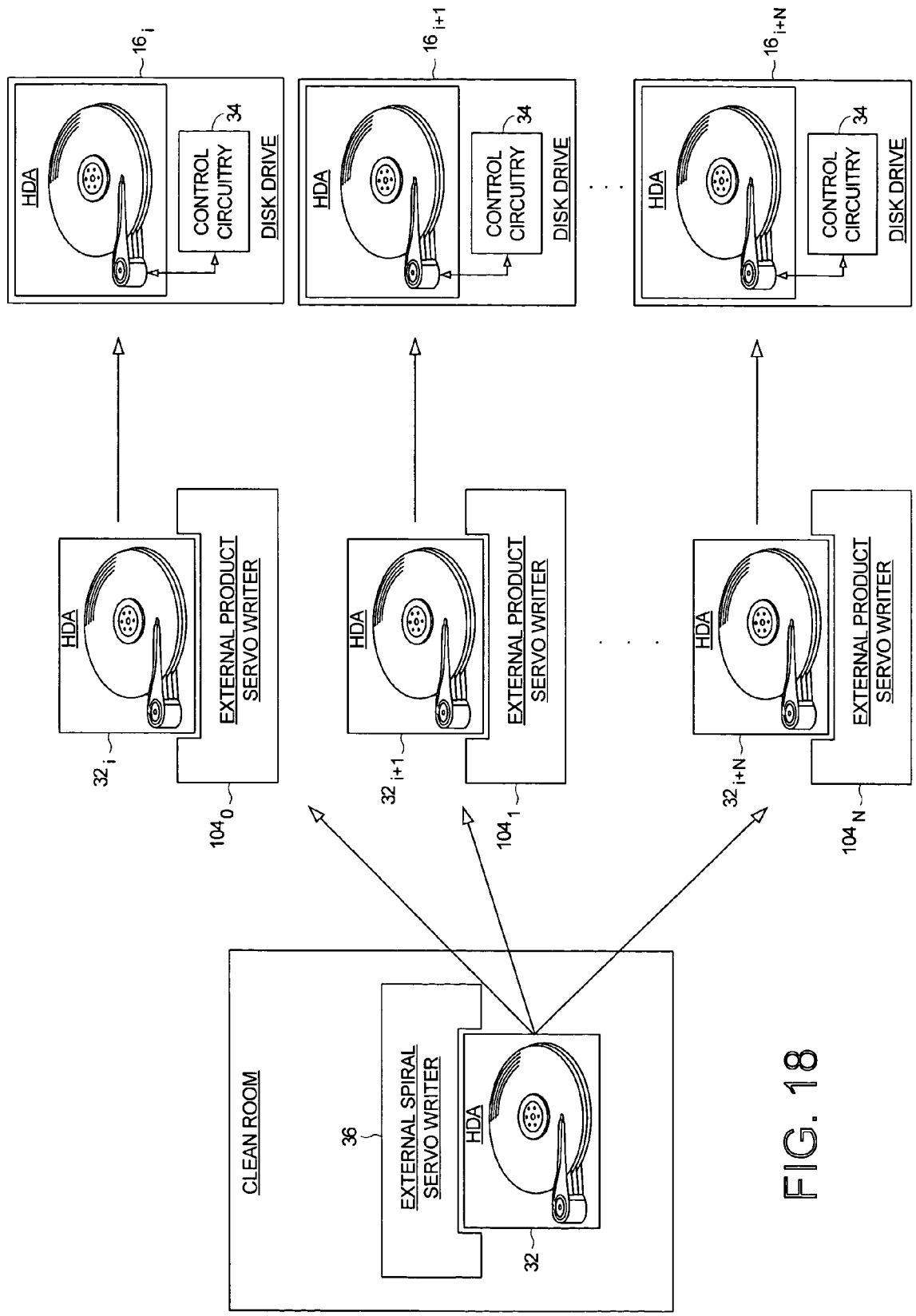
FIG. 18 shows an embodiment of the present invention wherein an external spiral servo writer is used to write the spiral tracks, and a plurality of external product servo writers write the product servo sectors for the HDAs output by the external spiral servo writer.

FIG. 17 shows an embodiment of the present invention wherein after writing the spiral tracks $20_0$–$20_N$ to the disk 18 (FIGS. 2A–2B), the HDA 32 is inserted into an external product servo writer 104 comprising suitable circuitry for reading and processing the spiral tracks $20_0$–$20_N$ in order to write the product servo sectors $56_0$–$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 88 applied to a servo controller 114. The servo controller 114 processes the servo burst signals 88 to generate the PES. The PES is processed to generate a VCM control signal applied to the VCM 30 over line 116 in order to maintain the head 28 along a circular path while writing the product servo sectors $56_0$–$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$–$20_N$ (e.g., timing information) and provides the product servo sector data to the read/write channel 106 at the appropriate time. The product servo sector data is provided to the preamp 108 which modulates a current in the head 28 in order to write the product servo sectors $56_0$–$56_N$ to the disk 18. The control circuitry 122 also transmits control information over line 126 to the servo controller 114 such as the target servo track to be written. After writing the product servo sectors $56_0$–$56_N$ to the disk 18, the HDA 32 is removed from the external product servo writer 104 and a printed circuit board assembly (PCBA) comprising the control circuitry 34 (FIG. 2A) is mounted to the HDA 32.

Figure 19:
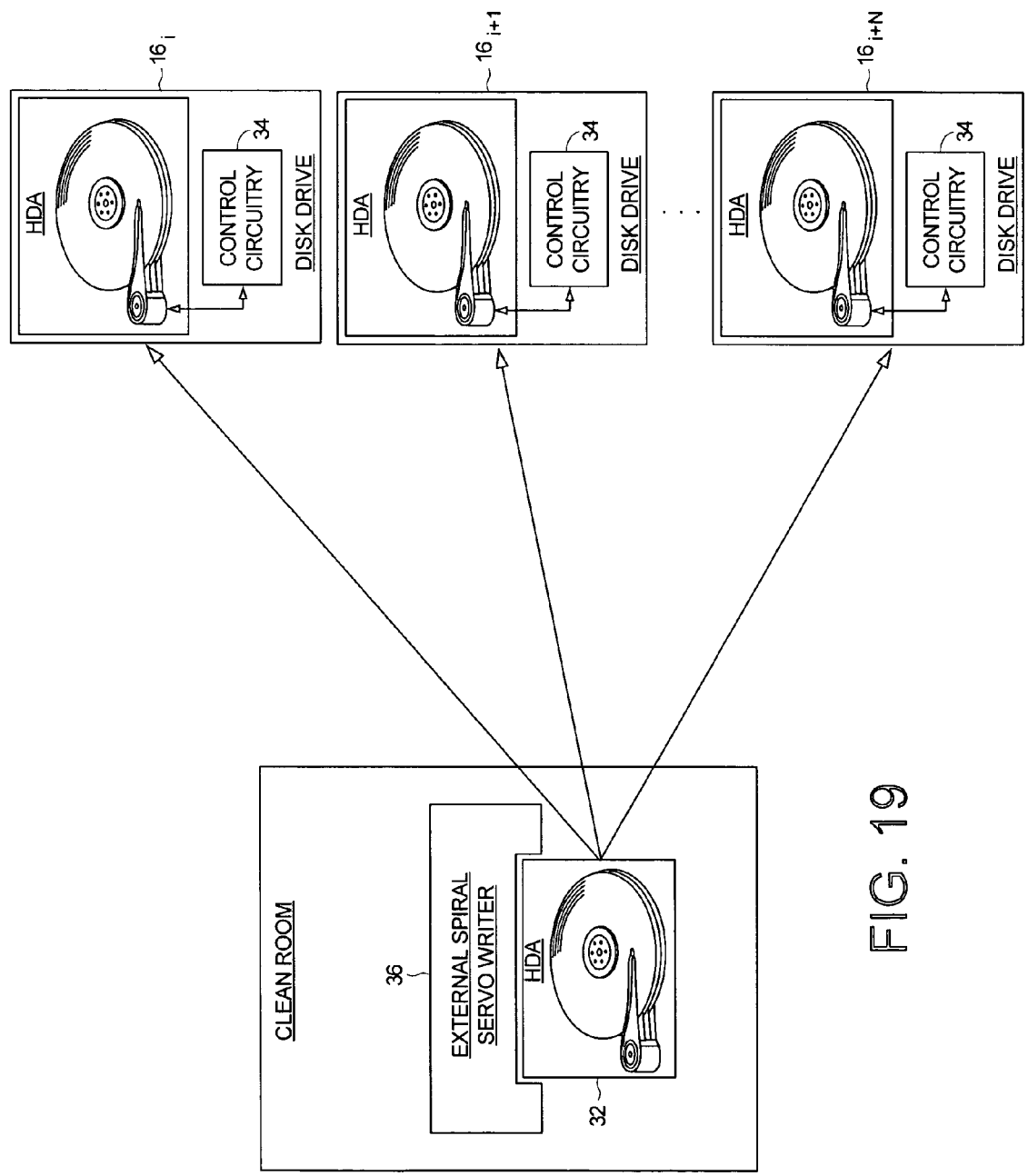
FIG. 19 shows an embodiment of the present invention wherein an external spiral servo writer is used to write the spiral tracks, and the control circuitry within each product disk drive is used to write the product servo sectors.

In one embodiment, the external product servo writer 104 of FIG. 17 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 18, a plurality of external product servo writers $140_0$–$104_N$ process the HDAs $32_i$–$32_{i+N}$ output by an external spiral servo writer 36 in order to write the product servo sectors less expensively and more efficiently than a conventional servo writer. In an alternative embodiment shown in FIG. 19, an external spiral servo writer 36 is used to write the spiral tracks, and the control circuitry 34 within each product disk drive $16_i$–$16_{i+N}$ is used to write the product servo sectors.

We claim:

1. A method of writing product servo sectors to a disk of a disk drive to define a plurality of data tracks, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a plurality of spiral tracks, the method comprising the steps of:
   (a) using the head internal to the disk drive to read the spiral tracks to generate a read signal;
   (b) processing the read signal to synchronize a servo write clock;
   (c) processing the read signal to generate a position error signal (PES) according to a PES algorithm, the position error signal used to maintain the head internal to the disk drive along a first servo track;
   (d) using the head internal to the disk drive and the servo write clock to write product servo sectors along the first servo track;
   (e) adjusting the PES algorithm to seek the head to a second servo track; and
   (f) using the head internal to the disk drive and the servo write clock to write product servo sectors along the second servo track.

2. The method as recited in claim 1, wherein an external spiral track writer is used to write the spiral tracks to the disk.

3. The method as recited in claim 1, wherein each spiral track comprises a high frequency signal interrupted at a predetermined interval by a sync mark.

4. The method as recited in claim 3, wherein the step of processing the read signal to synchronize a servo write clock comprises the step of detecting the sync marks in the spiral tracks.

5. The method as recited in claim 3, wherein the step of processing the read signal to generate the position error signal comprises the step of demodulating the high frequency signal in the spiral tracks.

6. The method as recited in claim 5, wherein the step of demodulating the high frequency signal in the spiral tracks comprises the step of demodulating the high frequency signal into a plurality of servo burst signals.

7. The method as recited in claim 6, wherein the step of generating the position error signal according to the PES algorithm comprises the step of computing a difference between the servo burst signals.

8. The method as recited in claim 7, wherein the step of adjusting the PES algorithm comprises the step of adjusting the computing of the difference between the servo burst signals.

9. The method as recited in claim 5, wherein the step of demodulating the high frequency signal in the spiral tracks comprises the step of integrating the read signal to generate a ramp signal.

10. The method as recited in claim 9, wherein the position error signal is generated relative to a target sync mark in a spiral track and a reference point of the ramp signal.

11. The method as recited in claim 10, wherein the step of adjusting the PES algorithm comprises the step of adjusting the reference point of the ramp signal.

12. The method as recited in claim 5, wherein the step of demodulating the high frequency signal in the spiral tracks comprises the step of generating an envelope signal from the read signal.

13. The method as recited in claim 12, wherein the position error signal is generated relative to a target sync mark in a spiral track and a peak in the envelope signal.

14. The method as recited in claim 13, wherein the step of adjusting the PES algorithm comprises the step of adjusting an offset relative the target sync mark and the peak in the envelope signal.

15. The method as recited in claim 1, further comprising the step of establishing an optimal target track density for the head and disk, wherein the PES algorithm is adjusted in response to the target track density.

16. The method as recited in claim 1, further comprising the step of adjusting the PES algorithm to attain a first density of data tracks over a first radial segment of the disk and adjusting the PES algorithm to attain a second density of data tracks over a second radial segment of the disk, the first density substantially different than the second density.

17. The method as recited in claim 1, wherein the PES algorithm is adjusted to compensate for a change in slope of the spiral tracks.

18. The method as recited in claim 17, wherein the slope of the spiral tracks changes toward an outer diameter of the disk due to an acceleration phase while writing the spiral tracks.

19. The method as recited in claim 17, wherein the slope of the spiral tracks changes toward an inner diameter of the disk due to a deceleration phase while writing the spiral tracks.

20. A disk drive comprising:
(a) a disk having a plurality of spiral tracks recorded thereon;
(b) a head actuated over the disk; and
(c) control circuitry for writing product servo sectors to the disk to define a plurality of data tracks by:
using the head internal to the disk drive to read the spiral tracks to generate a read signal;
processing the read signal to synchronize a servo write clock;
processing the read signal to generate a position error signal (PES) according to a PES algorithm, the position error signal used to maintain the head internal to the disk drive along a first servo track;
using the head internal to the disk drive and the servo write clock to write product servo sectors along the first servo track;
adjusting the PES algorithm to seek the head to a second servo track; and
using the head internal to the disk drive and the servo write clock to write product servo sectors along the second servo track.

21. The disk drive as recited in claim 20, wherein an external spiral track writer is used to write the spiral tracks to the disk.

22. The disk drive as recited in claim 20, wherein each spiral track comprises a high frequency signal interrupted at a predetermined interval by a sync mark.

23. The disk drive as recited in claim 22, wherein the control circuitry synchronizes the servo write clock by detecting the sync marks in the spiral tracks.

24. The disk drive as recited in claim 22, wherein the control circuitry generates the position error signal by demodulating the high frequency signal in the spiral tracks.

25. The disk drive as recited in claim 24, wherein the control circuitry demodulates the high frequency signal in the spiral tracks into a plurality of servo burst signals.

26. The disk drive as recited in claim 25, wherein the control circuitry generates the position error signal according to the PES algorithm by computing a difference between the servo burst signals.

27. The disk drive as recited in claim 26, wherein the control circuitry adjusts the PES algorithm by adjusting the computing of the difference between the servo burst signals.

28. The disk drive as recited in claim 24, wherein the control circuitry demodulates the high frequency signal in the spiral tracks by integrating the read signal to generate a ramp signal.

29. The disk drive as recited in claim 28, wherein the control circuitry generates the position error signal relative to a target sync mark in a spiral track and a reference point of the ramp signal.

30. The disk drive as recited in claim 29, wherein the control circuitry adjusts the PES algorithm by adjusting the reference point of the ramp signal.

31. The disk drive as recited in claim 24, wherein control circuitry demodulates the high frequency signal in the spiral tracks by generating an envelope signal from the read signal.

32. The disk drive as recited in claim 31, wherein the control circuitry generates the position error signal relative to a target sync mark in a spiral track and a peak in the envelope signal.

33. The disk drive as recited in claim 32, wherein the control circuitry adjusts the PES algorithm by adjusting an offset relative the target sync mark and the peak in the envelope signal.

34. The disk drive as recited in claim 20, wherein the control circuitry establishes a target track density for the head and disk and adjusts the PES algorithm in response to the target track density.

35. The disk drive as recited in claim 20, wherein the control circuitry adjusts the PES algorithm to attain a first density of data tracks over a first radial segment of the disk and adjusts the PES algorithm to attain a second density of data tracks over a second radial segment of the disk, the first density substantially different than the second density.

36. The disk drive as recited in claim 20, wherein the control circuitry adjusts the PES algorithm to compensate for a change in slope of the spiral tracks.

37. The disk drive as recited in claim 36, wherein the slope of the spiral tracks changes toward an outer diameter of the disk due to an acceleration phase while writing the spiral tracks.

38. The disk drive as recited in claim 36, wherein the slope of the spiral tracks changes toward an inner diameter of the disk due to a deceleration phase while writing the spiral tracks.

* * * * *